United States Patent
Wangler et al.

(12) 
(10) Patent No.: US 11,927,105 B1
(45) Date of Patent: Mar. 12, 2024

(54) THRUST BEARINGS TO SUPPORT AXIAL THRUST IN PUMPS

(71) Applicant: General Electric Company, Schenectady, NY (US)

(72) Inventors: Adam Joseph Wangler, Evendale, OH (US); David Raju Yamarthi, Bengaluru (IN); Ravindra Shankar Ganiger, Bengaluru (IN); Santosh Kumar Pattnaik, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/066,707

(22) Filed: Dec. 15, 2022

(30) Foreign Application Priority Data

Sep. 16, 2022 (IN) .............................. 202211053092

(51) Int. Cl.
*F01D 25/16* (2006.01)
*F01D 3/04* (2006.01)
*F01D 15/08* (2006.01)

(52) U.S. Cl.
CPC ............ *F01D 25/168* (2013.01); *F01D 3/04* (2013.01); *F01D 15/08* (2013.01)

(58) Field of Classification Search
CPC .................................. F01D 3/04; F01D 25/168
See application file for complete search history.

(56) References Cited

U.S. PATENT DOCUMENTS

| | | | |
|---|---|---|---|
| 3,498,686 A | * | 3/1970 | Hans .................. F01D 21/08 384/420 |
| 9,932,861 B2 | | 4/2018 | Preuss et al. |
| 10,344,608 B2 | | 7/2019 | Gaia et al. |
| 10,443,438 B2 | | 10/2019 | Phui et al. |
| 10,570,777 B2 | | 2/2020 | Bowan |

FOREIGN PATENT DOCUMENTS

| | | |
|---|---|---|
| CN | 110925033 A | 3/2020 |
| CN | 211038755 U | 7/2020 |
| CN | 113898427 A | 1/2022 |
| EP | 3805529 A1 | 4/2021 |
| WO | 2016073252 A1 | 5/2021 |

* cited by examiner

*Primary Examiner* — Brian O Peters
(74) *Attorney, Agent, or Firm* — Hanley, Flight & Zimmerman, LLC

(57) ABSTRACT

Apparatus, systems, and articles of manufacture are disclosed to dynamically support axial thrust in pumps. Examples disclosed herein include a thrust bearing system including a thrust disc coupled to an impeller shaft; a first thrust pad coupled to a body of the pump, the first thrust pad positioned on a forward side of the thrust disc; a second thrust pad coupled to the body of the pump, the second thrust pad positioned on an aft side of the thrust disc; and a spring-loaded assembly integrated into the first and second thrust pads, the spring-loaded assembly connected to a pump outlet via a first flowline, the first flowline to transmit a working fluid from the pump outlet to the forward side of the thrust disc or the aft side of the thrust disc based on a position of the spring-loaded assembly.

20 Claims, 12 Drawing Sheets

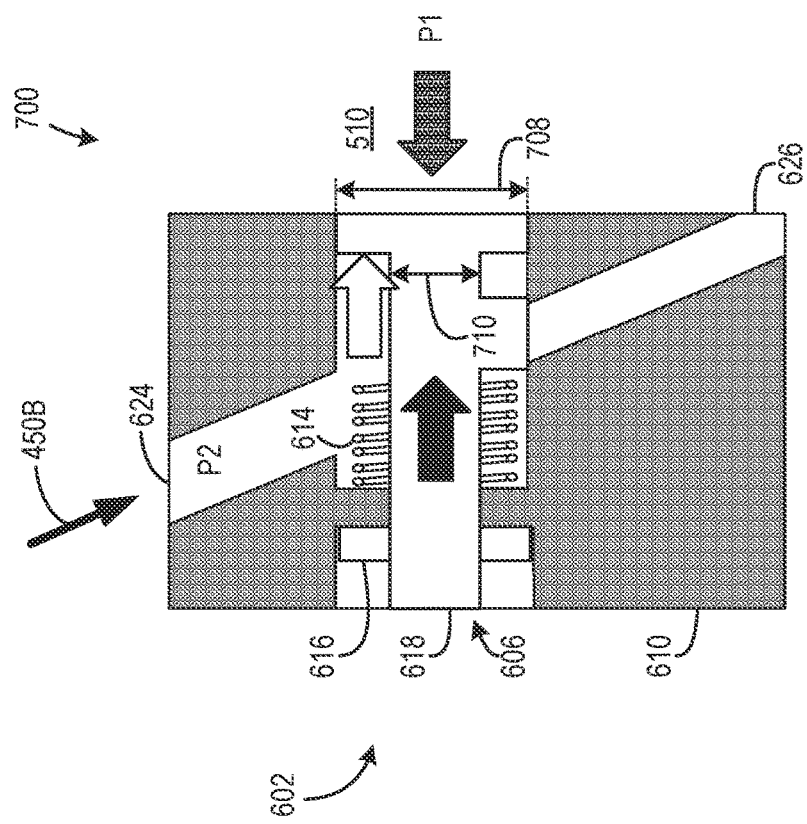
FIG. 7
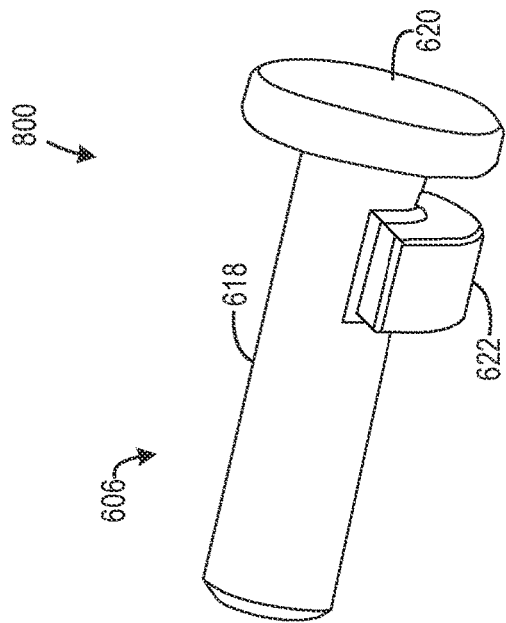
FIG. 8

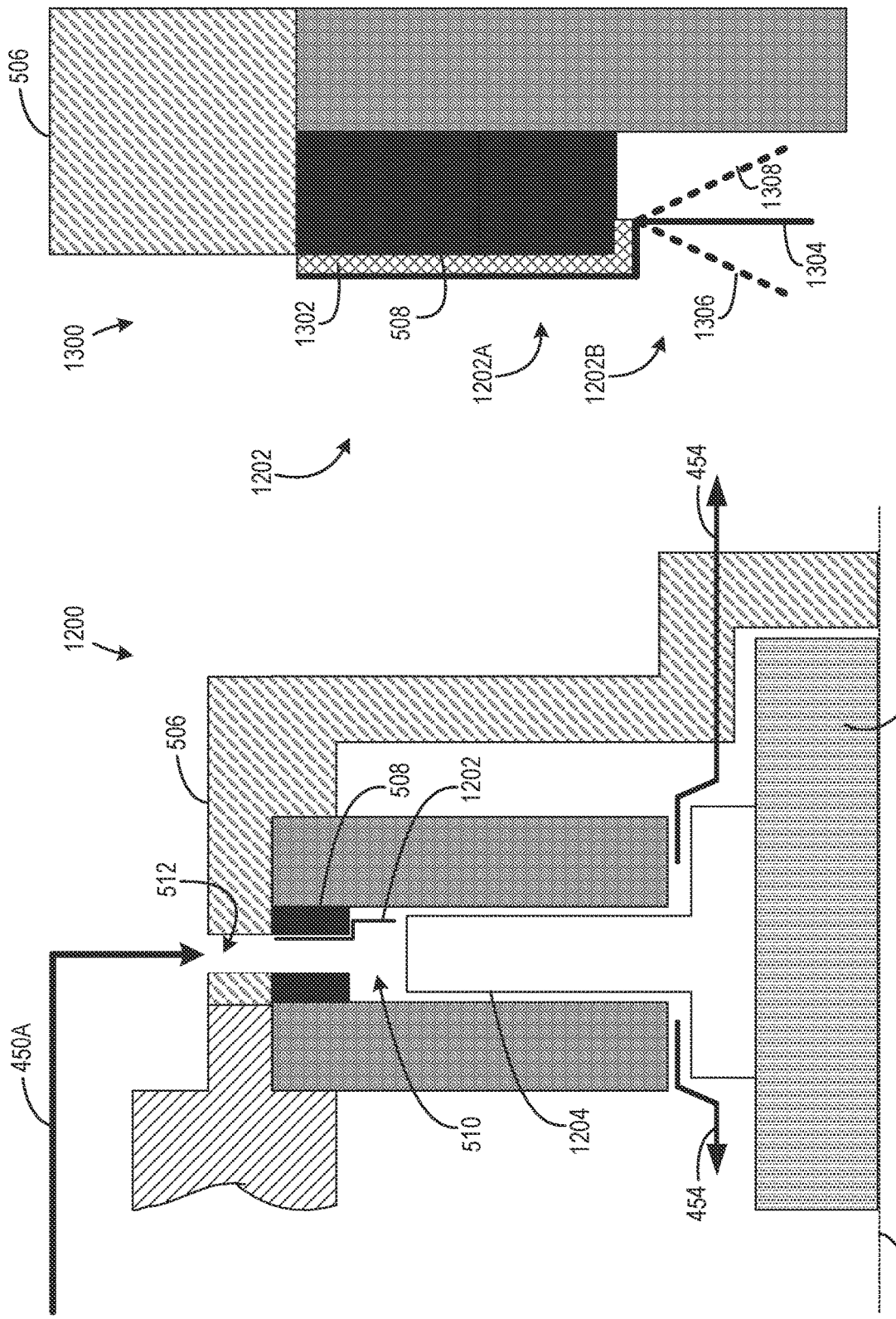

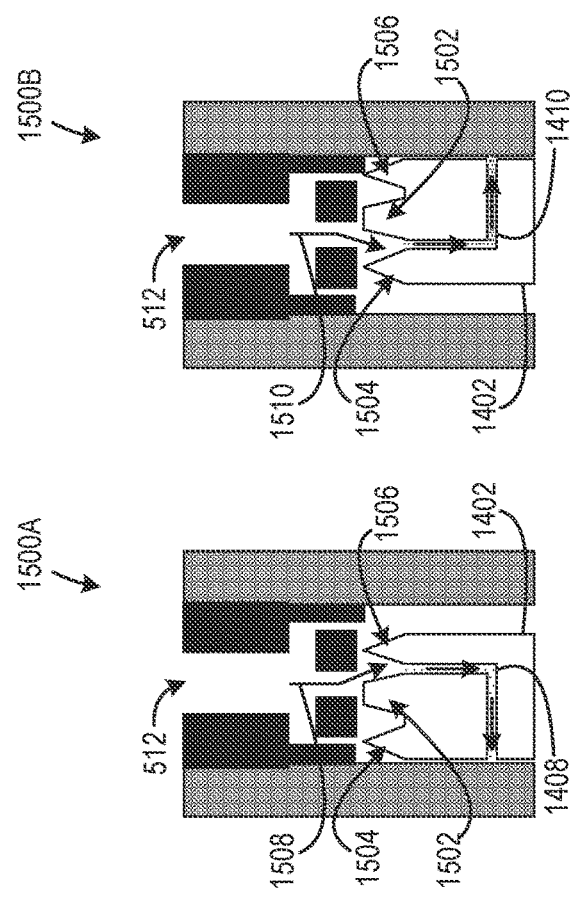
FIG. 15A
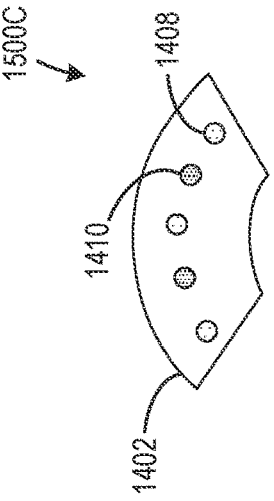
FIG. 15B
FIG. 15C
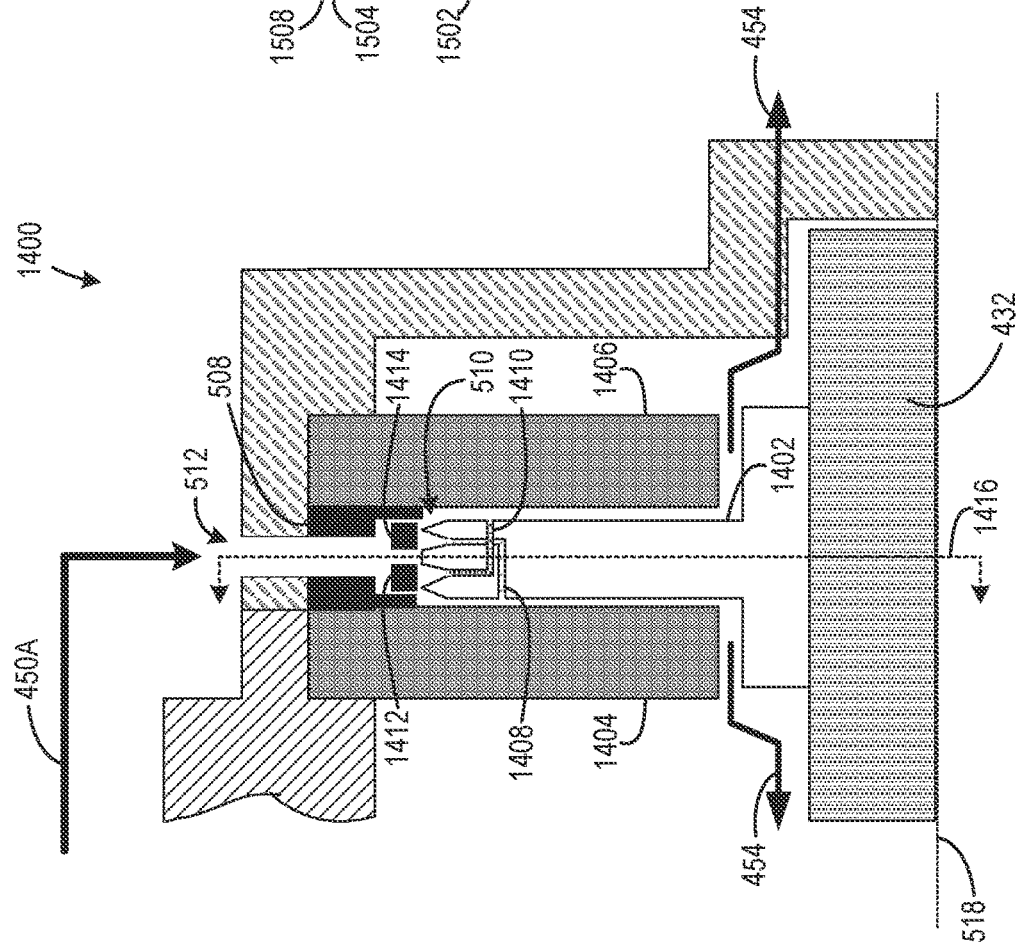
FIG. 14

THRUST BEARINGS TO SUPPORT AXIAL THRUST IN PUMPS

RELATED APPLICATION

This patent claims the benefit of Indian Provisional Patent Application No. 202211053092, which was filed on Sep. 16, 2022. Indian Provisional Patent Application No. 202211053092 is hereby incorporated herein by reference in its entirety. Priority to Indian Provisional Patent Application No. 202211053092 is hereby claimed.

FIELD OF THE DISCLOSURE

This disclosure relates generally to fluid pumps, and, more particularly, to thrust bearings to support axial thrust in pumps.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

FIG. 7 is a magnified view of a portion of the example first dynamic thrust bearing system in accordance with the teachings disclosed herein.

FIG. 8 is a schematic isometric view of an example pump of the first dynamic thrust bearing system in accordance with the teachings disclosed herein.

FIG. 12 is a schematic illustration of an example fourth dynamic thrust bearing system in accordance with the teachings disclosed herein.

FIG. 13 is a magnified view of a portion of the example fourth dynamic thrust bearing system in accordance with the teachings disclosed herein.

FIG. 14 is a schematic illustration of an example fifth dynamic thrust bearing system in accordance with the teachings disclosed herein.

FIGS. 15A-C are schematic illustrations of cross-sectional views of the example fifth dynamic thrust bearing system in accordance with the teachings disclosed herein.

The figures are not to scale. In general, the same reference numbers will be used throughout the drawing(s) and accompanying written description to refer to the same or like parts.

DETAILED DESCRIPTION

Figure 1:
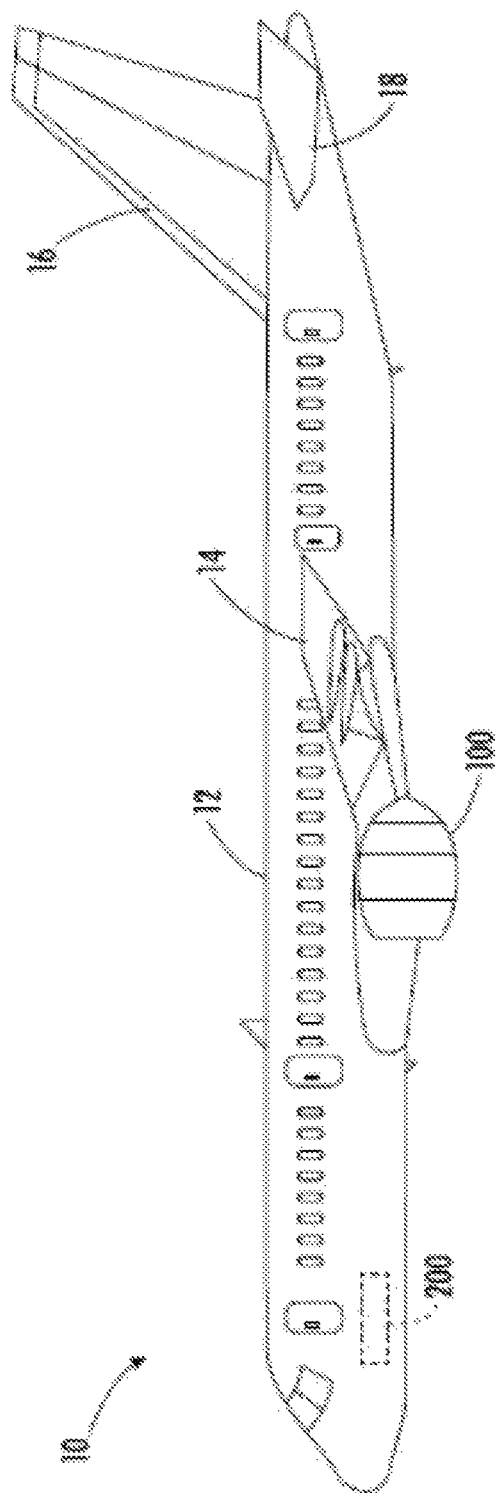
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "radially" is used to express a point or points along a radial vector originating at a central axis of a rotating body and pointing perpendicularly outward from the central axis. In some examples, fluid is said to accelerate radially outward from an impeller, meaning that the fluid flows outward from a central axis (axis of rotation) of the impeller at a direction that is substantially orthogonal to the central axis.

Centrifugal fluid pumps move fluid (e.g., fuel, water, oil, supercritical carbon dioxide (sCO2), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to the rotor of the electric motor. The rotor is provided a change in mechanical work over a period of time (i.e., mechanical power) from a stator in the electric motor applying electromagnetic forces to the rotor in the form of torque. When the motor supplies a constant amount of electrical energy to the stator, then the rotor will supply a constant amount of mechanical energy to the impeller.

During operation of the pump, spinning of the impeller shaft and impeller can cause the impeller shaft to radially vibrate within housing(s) of the pump. The pump housing(s) internally frame(s) radial bearings (e.g., hydrodynamic bearings, foil bearings, rolling-element bearings, etc.) to support radial loads (e.g., weight) of the impeller shaft and dampen the vibrations. Also during pump operations, the impeller shaft may experience axial loads that act generally parallel to the central axis of the pump and/or impeller shaft. Axial loads acting on the impeller can be unbalanced, meaning that a forward axial load (e.g., axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include axial bearings (e.g., hydrodynamic bearings, foil bearings, etc.) that support axial thrusts of the impeller shaft and reduce, inhibit, and/or dampen such movements.

In some examples, the fluid (e.g., sCO2, oil, liquid helium, etc.) that the pump pressurizes in the system can be used to lubricate the radial or axial bearings to reduce frictional forces between rotating elements within those bearings. For example, the pump can include flowlines leading from a pump outlet to the axial bearings to provide and/or transmit pressurized fluid to a thrust bearing. The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end, portion, face, etc. of the impeller can transfer aft axial loads to the impeller shaft in the aft direction. Similarly, the fluid in the pump housing flows forward along the axis of rotation of the impeller shaft and builds up pressure on an aft side, end, portion, face, etc. of the impeller (e.g., the expeller). Fluid pressure on an aft side of the impeller can transfer forward loads to the impeller shaft in the forward direction. When the forward and aft axial loads are of equal values and act in opposite directions, the pump is said to be "thrust balanced." As used herein, "forward thrust" refers to unbalanced thrust of the impeller shaft acting in the forward direction due to the forward axial load exceeding the aft axial load. As used herein, "aft thrust" refers to unbalanced thrust of the impeller shaft acting in the aft direction due to the aft axial load exceeding the forward axial load.

In some examples, when the pump operates at substantially low rotational speeds, angular velocities, operating speeds, etc. (e.g., 500, 1,000, 2,500 rpm, etc.), the fluid pressure at the pump inlet exceeds the fluid pressure within the pump housing(s). Thus, at substantially low operating speeds ("low speeds"), aft thrust of the impeller shaft is induced. In some examples, when the pump operates at substantially high rotational speeds, angular velocities, operating speeds, etc. (e.g., 5000, 10,000, 25,000 revolutions per minute (rpm), etc.), the fluid pressure within the pump housing(s) exceeds the fluid pressure at the pump inlet. Thus, at substantially high operating speeds ("high speeds"), forward thrust of the impeller shaft is induced. When forward thrust or aft thrust is applied to the impeller shaft, axial displacement (e.g., in forward or aft directions) of the impeller shaft from an initial position can occur by some amount (e.g., 0.001, 0.005, 0.010 inches (in), etc.) despite the axial support of the thrust bearing(s). At some operational speeds of the pump, the axial thrust acting on the impeller shaft can oscillate between forward and aft directions. At such speeds the thrust can oscillate at frequencies that known thrust bearings are incapable of adaptively and/or dynamically supporting or cannot support quickly, efficiently, and/or adequately enough.

In examples disclosed herein, dynamic thrust bearing systems can adjust fluid pressures on forward or aft sides of the thrust disc to counteract the forward or aft thrust and inhibit, dampen, and/or restrict axial movement of the impeller shaft. In some examples, lubrication flowline(s) (e.g., primary flowline, secondary flowline(s), etc.) lead the fluid to the dynamic thrust bearing system (e.g., thrust pads and/or thrust disc) at an outer diameter of the dynamic thrust bearing system (e.g., traveling external to the pump housing(s)) and/or at points distal to a central axis of the dynamic thrust bearing system. In some examples, the lubrication flowline(s) direct the fluid to the dynamic thrust bearing system at an inner diameter of the dynamic thrust bearing system (e.g., internal to the pump housing(s)) and/or at points proximal to the central axis of the dynamic thrust bearing system. Rotation of the thrust disc in the dynamic thrust bearing system causes the fluid to pressurize between the thrust disc and the forward and aft thrust pads. In other words, the pressurized fluid, at least partially, bears the axial thrust of the impeller shaft.

In some examples, first and second secondary flowlines of the secondary lubrication flowline terminate at the forward and aft thrust pads, respectively, where hydraulically actuated systems (e.g., spring-loaded plungers, diaphragms, etc.) can permit, inhibit, and/or prohibit the fluid from entering the system. For example, when the pump operates at low speeds, when aft thrust of the impeller shaft occurs, and/or when the impeller shaft moves in the aft direction, the fluid pressure on the aft side of the thrust disc can increase, cause an aft hydraulically actuated system to open, permit the fluid to enter a bearing chamber on the aft side of the thrust disc, further increase the aft fluid pressure, and inhibit, counteract, and/or stabilize aft movement of the thrust disc and/or impeller shaft.

In some other examples, the pump includes the primary flowline leading to the thrust disc via the outer diameter and/or inner diameter of the pump and/or dynamic thrust bearing system. A tapered thrust disc and/or a smart-memory alloy (SMA) deflector can encourage the fluid to divert to one side of the thrust disc and counteract and/or stabilize movement of the impeller shaft. For example, the tapered thrust disc or SMA deflector can increase flow to the forward side of the thrust disc, increase the forward fluid pressure, and inhibit, counteract, and/or stabilize forward movement of the thrust disc and/or impeller shaft.

In some other examples, the outer diameter of the thrust disc can resemble the structure and/or functionality of a labyrinth seal. Furthermore, the thrust pads and/or other parts of the dynamic thrust bearing system can divide the flow path of the primary flowline into separate internal channels of the thrust disc depending on a position of the impeller shaft and/or the thrust disc. For example, as the impeller shaft moves forward, forward internal passages become exposed, which direct the fluid to the forward side of the thrust disc, increase the forward fluid pressure, and inhibit, counteract, and/or stabilize forward movement of the thrust disc and/or impeller shaft.

Example dynamic thrust bearing systems disclosed herein reduce the amount of axial movement that the impeller shaft experiences due to forward and aft thrusts. Example dynamic thrust bearing systems disclosed herein can also dampen or otherwise reduce the frequency of oscillations in the impeller shaft due to unbalanced and alternating axial thrusts. Thus, examples disclosed herein can reduce a frequency or magnitude at which the impeller shaft or parts coupled thereto physically contact other part(s) and/or housing(s) of the pump. Furthermore, example systems disclosed herein can improve the operational efficiency of the pump (e.g., centrifugal sCO2 pump) by minimizing frictional energy losses associated with axial impeller shaft movement. Furthermore, the example systems disclosed herein can increase the time between maintenance services to repair and/or replace component(s) of the thrust bearing(s), motor, pump, etc.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
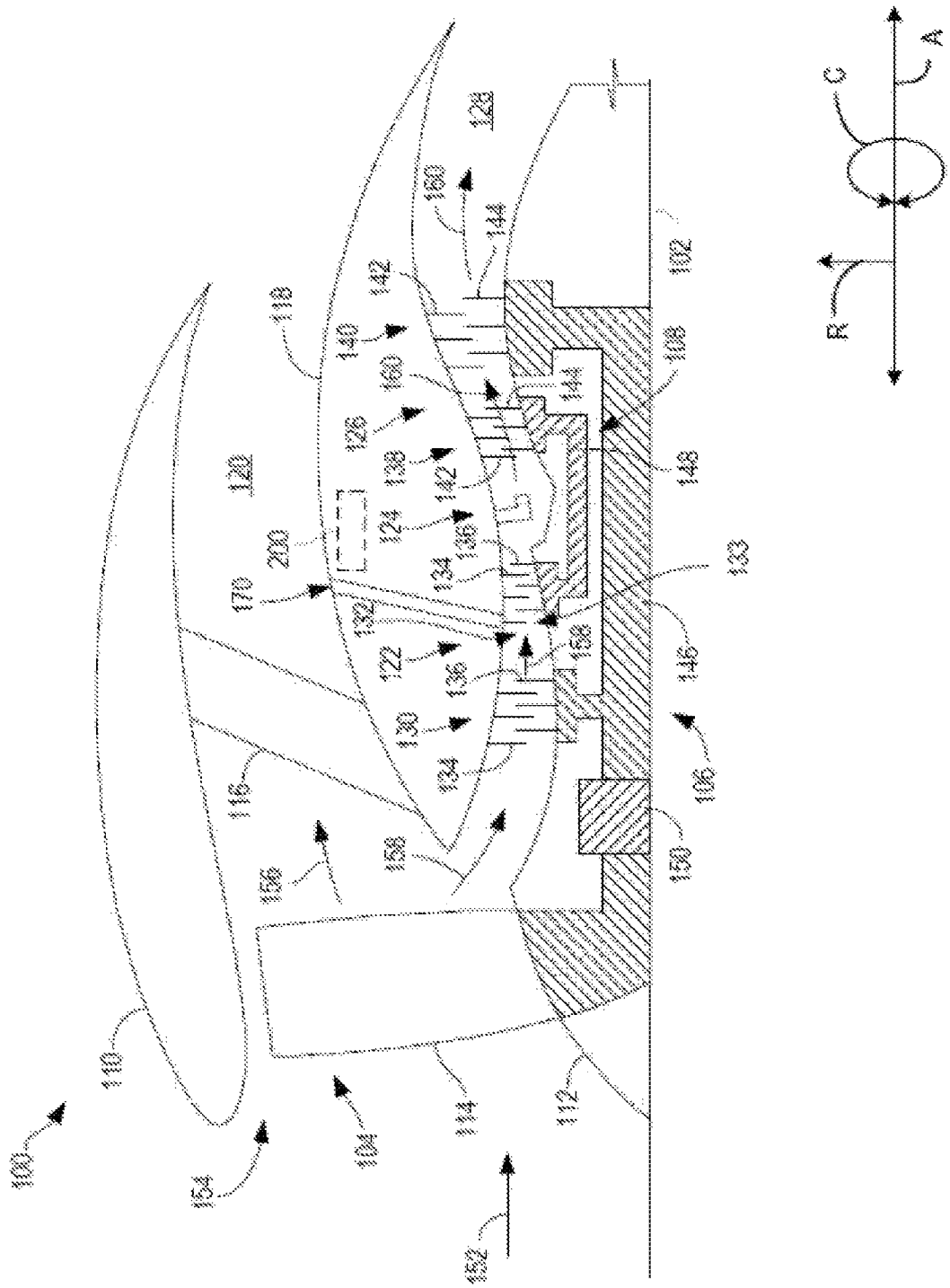
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows compressed a portion of the second portion 158 of the air 152 from the compressor section 122 to bypass the combustion section 124. More specifically, in some examples, the third-stream flow path 170 defines a concentric or non-concentric passage relative to the compressed air flow path 170 downstream of one or more of the compressors 130, 132 or the fan 104. The third-stream flow path 170 can be configured to selectively remove the second portion 158 of the air 152 from the compressed air flow path 170 via one or more variable guide vanes, nozzles, or other actuatable flow control structures. In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., supercritical carbon dioxide (sCO2), etc.)) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-3. Thus, the present subject matter can be readily adaptable to another engine and/or another heat transfer application associated with another type of vehicle.

Figure 3:
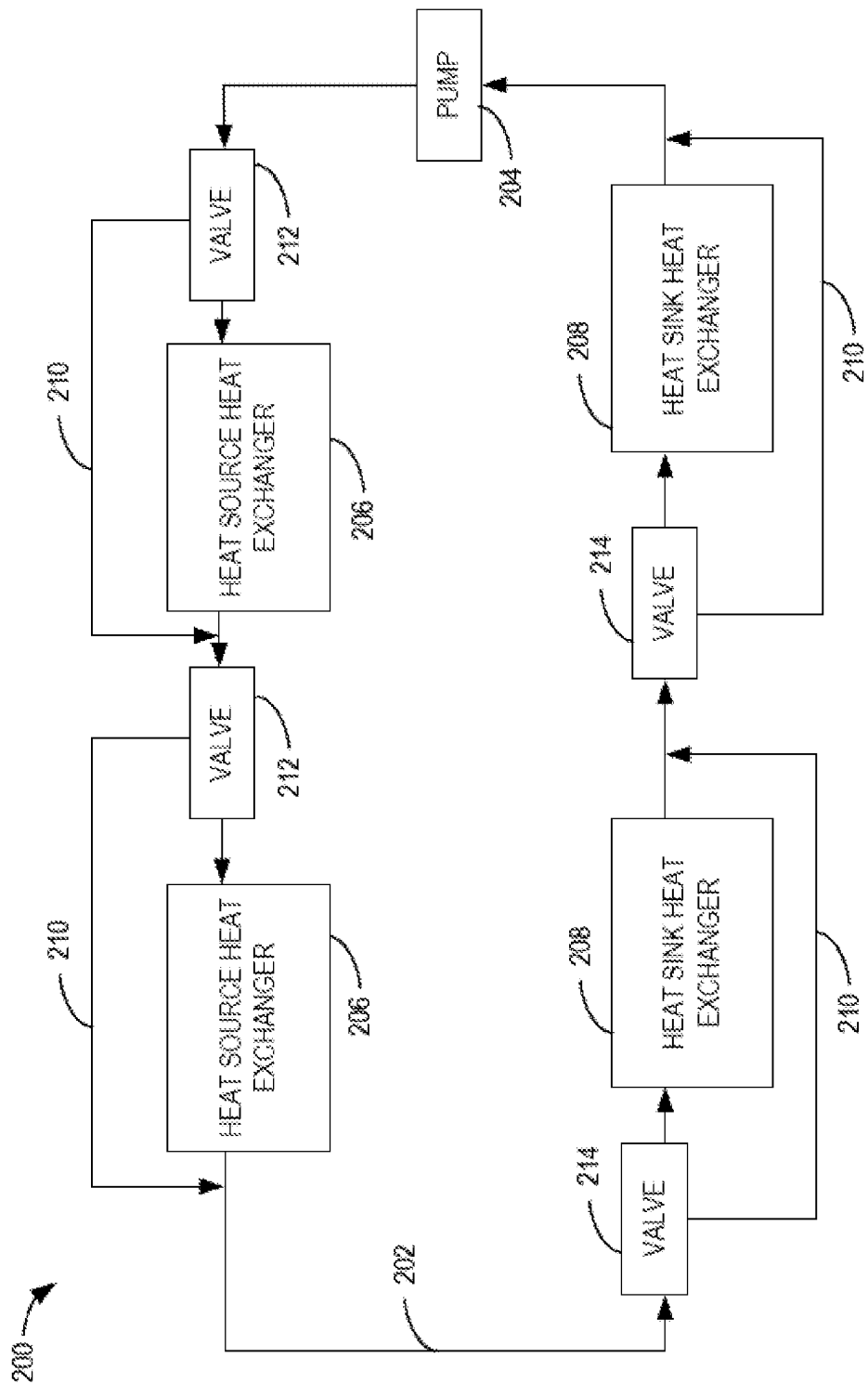
FIG. 3 is a schematic diagram of an example thermal management system for transferring heat between fluids.

FIG. 3 is a schematic view of an example implementation of the thermal management system 200 for transferring heat between fluids. In general, the thermal management system 200 is discussed in the context of the aircraft 10 and the gas turbine engine 100 described above and shown in FIGS. 1 and 2. However, the thermal management system 200 can be implemented within another type of aircraft and/or another gas turbine engine of another configuration.

As shown, the thermal management system 200 includes a thermal transport bus 202. Specifically, in some examples, the thermal transport bus 202 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as supercritical carbon dioxide, oil, liquid helium, etc. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, which cools the fluids supporting the operation of the aircraft 10. Thus, the heat source heat exchanger(s) 206 adds heat to the heat exchange fluid. Although FIG. 3 illustrates two heat source heat exchangers 206, the thermal management system 200 can include a single heat source heat exchanger 206 or three or more heat source heat exchangers 206.

The heat source heat exchanger(s) 206 can correspond to many configurations of heat exchanger(s) that cool a fluid supporting the operation of the aircraft 10. In some examples, at least one of the heat exchangers 206 is a heat exchanger(s) of the lubrication system(s) of the engine(s) 100. In such examples, the heat exchanger(s) 206 transfers heat from the oil lubricating the engine(s) 100 to the heat transfer fluid. In some other examples, at least one of the heat exchangers 206 is a heat exchanger(s) of the cooling system of the engine(s) 100. In such examples, the heat exchanger(s) 206 transfers heat from the cooling air bled from the compressor section(s) 122 (or a compressor discharge plenum) of the engine(s) 100 to the heat transfer fluid. However, in some other examples, the heat source heat exchanger(s) 206 corresponds to other types of heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, which heats the other fluids supporting the operation of the aircraft 10. Thus, the heat sink heat exchangers 208 remove heat from the heat exchange fluid. Although FIG. 3 illustrates two heat sink heat exchangers 208, the thermal management system 200 can include three or more heat sink heat exchangers 208.

The heat sink heat exchangers 208 can correspond to many configurations exchangers that heat a fluid supporting the operation of the aircraft 10. For example, at least of one of the heat exchangers 208 is a heat exchanger(s) of the fuel system(s) of the engine(s) 100. In such examples, the fuel system heat exchanger(s) 208 transfers heat from the heat transfer fluid to the fuel supplied to the engine(s) 100. In some other examples, at least one of the heat exchangers 208 is a heat exchanger(s) in contact with the first portion 156 of the air 152 flowing through the bypass airflow passage(s) 120 of the engine(s) 100. In such examples, the heat exchanger(s) 208 transfers heat from the heat exchange fluid to the first portion 156 of the air 152 flowing through the bypass airflow passage(s) 120.

In some examples, one or more of the heat exchangers 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transport bus 202 can be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat exchanger(s) 208 to be smaller than heat exchangers relying on other heat sinks within the engine. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat sink heat exchangers 208 correspond to other types of heat exchangers that heat a fluid supporting the operation of the aircraft 10.

Moreover, in some examples, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in some other examples, other numbers of heat exchangers 206, 208 can have a corresponding bypass conduit 210 so long as there is at least one bypass conduit 210.

Additionally, in some examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 can be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 can fall outside of a desired pressure range. When the pressure of the heat exchange fluid is too high, the thermal management system 200 can incur accelerated wear. In this respect, when the pressure of the heat exchange fluid within the thermal transport bus 202 exceeds a maximum or otherwise increased pressure value, one or more heat source valves 212 open. In such examples, at least a portion of the heat exchange fluid flows through the bypass conduits 210 instead of the heat source heat exchanger(s) 206. Thus, less heat is added to the heat exchange fluid by the heat source heat exchanger(s) 206, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchangers 206, 208, the bypass conduit(s) 210, and/or the valves 212, 214.

Conversely, when the pressure of the heat exchange fluid is too low, the pump 204 can experience operability problems and increased wear. As such, when the pressure of the heat exchange fluid within the thermal transport bus falls below a minimum or otherwise reduced pressure value, one or more thermal sink valves 214 open. In such examples, at least a portion of the heat exchange fluid flows through the bypass conduits 210 instead of the heat sink heat exchangers 208. Thus, less heat is removed from the heat exchange fluid by the heat sink heat exchangers 208, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is carbon dioxide).

As such, the thermal management system 200 can be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 can increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. When the example second flow rate is below a desired operating flow rate of the heat exchange fluid, the pump 204 can either be of a different architecture that outputs a higher first flow rate, or one or more additional pumps 204 can be included in the thermal management system 200.

Figure 4:
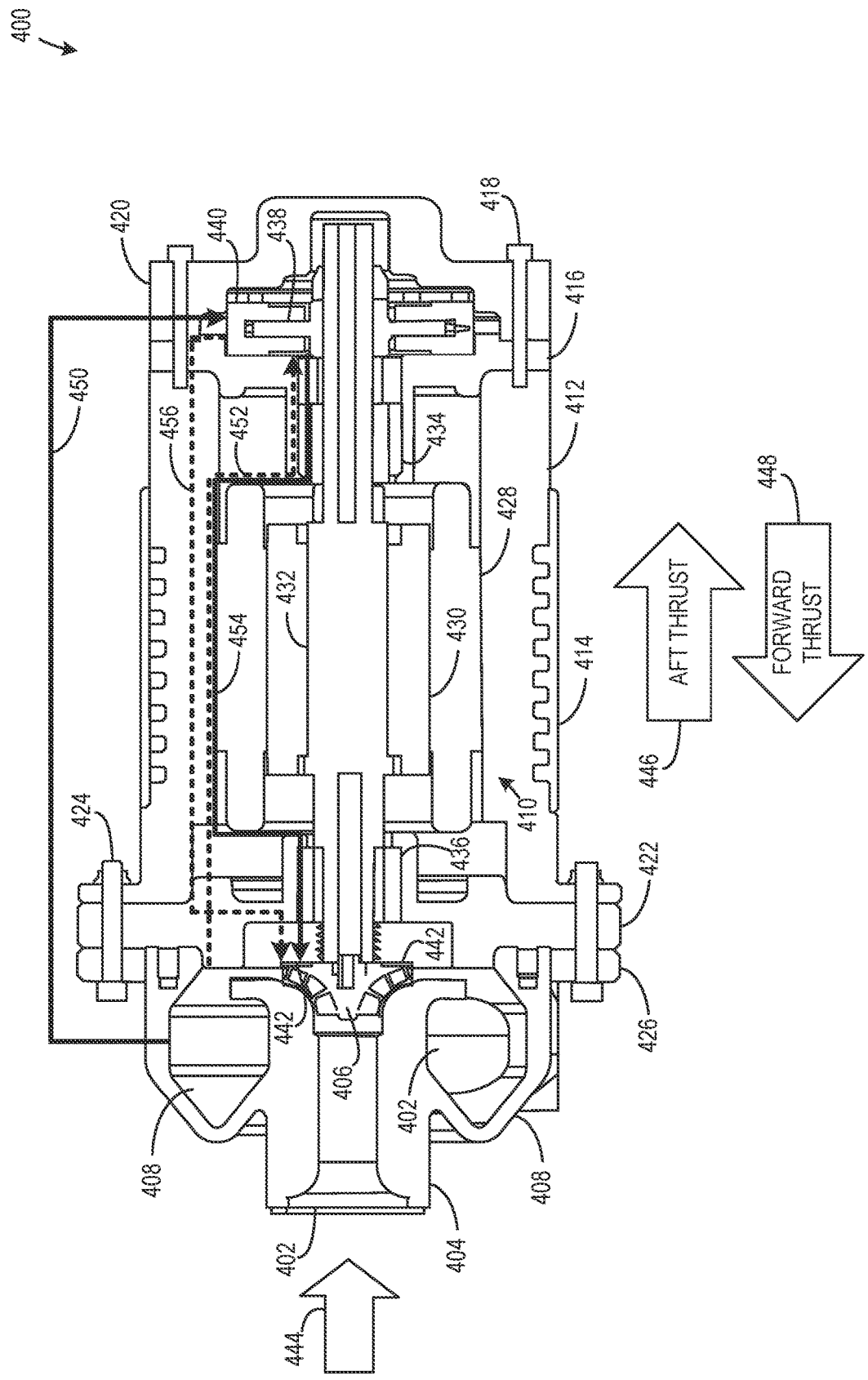
FIG. 4 is a schematic illustration of an example thermal transport bus pump.

FIG. 4 is a schematic illustration of an example thermal transport bus pump 400 (e.g., a supercritical carbon dioxide (sCO2) pump, the pump 204 of FIG. 3, etc.). In the illustrated example of FIG. 4, the thermal transport bus pump 400 drives a heat exchange fluid, such as supercritical carbon dioxide, through one or more fluid conduits (e.g., the thermal transport bus 202 of FIG. 3) 402. Specifically, the heat exchange fluid flows through an inlet pipe 404 and encounters an impeller 406 (e.g., a compressor wheel) that rotates to drive the heat exchange fluid through a pump outlet 408 fluidly coupled to the fluid conduit(s) 402. In turn, the fluid conduit(s) 402 can feed the heat exchange fluid to one or more heat exchangers (e.g., the heat exchanger 206, 208 of FIG. 3). Accordingly, the thermal transport bus pump 400 can pump the heat exchange fluid to manage a thermal energy of working fluids associated with the aircraft 10 of FIG. 1 and/or the gas turbine engine 100 of FIG. 2.

In the illustrated example of FIG. 4, the thermal transport bus pump 400 includes a motor 410 positioned in a motor housing 412. In FIG. 4, the motor 410 is an induction motor operatively coupled to a variable frequency drive (VFD) and controlling circuitry (not shown), such as a full authority digital engine control (FADEC), that controls a rotational speed of the motor 410. For example, the controlling circuitry can operate the motor 410 based on a pressure and/or a temperature of the heat exchange fluid in the fluid conduit(s) 402 and/or in the thermal transport bus pump 400. In some examples, the controlling circuitry can operate the motor 410 based on a pressure and/or a temperature of the working fluids affected by the heat exchange fluid. Additionally or alternatively, the controlling circuitry can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 414 to prevent the motor 410 from overheating. An aft end of the motor housing 412 is coupled to an aft bearing housing 416 via first bolts 418. Furthermore, an end cap 420 is coupled to the aft bearing housing 416 via the first bolts 418. A forward end of the motor housing 412 is coupled to a forward bearing housing 422 opposite the aft bearing housing 416 via second bolts 424. Moreover, the forward bearing housing 422 is coupled to a backplate 426 and the pump outlet 408 on an opposite side of the backplate 426 via the second bolts 424.

In the illustrated example of FIG. 4, the motor 410 includes a stator 428 to induce alternating electrical currents in field coils and emit alternating magnetic fields about a central axis of the motor 410. The alternating magnetic fields interact with permanent magnets of a rotor 430 and, in turn, provide torque to the rotor 430. The rotor 430 is fixedly coupled to an impeller shaft 432 ("shaft 432"), and the shaft is fixedly coupled to the impeller 406. As such, the motor 410 drives a rotation of the shaft 432 and, in turn, a rotation of the impeller 406. An aft end of the shaft 432 is supported by a first radial foil bearing 434, which is coupled to the aft bearing housing 416. Similarly, a forward end of the shaft 432 is supported by a second radial bearing 436 coupled to the forward bearing housing 422. The first radial foil bearing 434 and the second radial bearing 436 include spring-loaded foil journal linings that support radial loads of the shaft 432 during substantially low (e.g., startup) rotational speeds (e.g., 0-5,000 rotations per minute (rpm), etc.). When the motor 410 causes the shaft 432 to rotate at a substantially high (e.g., operational) rotational speed (e.g., 5000-20,000 rpm, etc.), a pressure of the working medium (e.g., air, oil, supercritical carbon dioxide (sCO2), etc.) increases and pushes the foil lining radially outward. Thus, the pressurized working medium supports the radial loads of the shaft 432 when the shaft 432 is rotating at operational speeds (e.g., 3000 rpm, 10,000 rpm, 25,000 rpm, etc.).

In the illustrated example of FIG. 4, a thrust disc 438 of the shaft 432 is supported by a thrust bearing system 440. For example, the thrust bearing system 440 can include foil bearings to support axial loads of the shaft 432 via interactions with the thrust disc 438. In some examples, the thrust bearing system 440 is coupled to the aft bearing housing 416 and/or the end cap 420 via bolts.

The example impeller 406 of the pump 400 includes expeller vanes 442 on an aft portion of the impeller 406. At operational speeds of the motor 410, the expeller vanes 442 cause the working fluid (e.g., sCO2) to flow forward from the forward bearing housing 422, motor housing 412, etc. into the fluid conduit 402.

In the illustrated example of FIG. 4, the example sCO2 fluid flows into the pump 400 by way of the fluid conduit 402 as illustrated with an arrow indicating a flow direction 444. At low speeds (e.g., startup speeds) of the motor 410, the flow direction 444 of the example sCO2 imparts an aft thrust 446 on the impeller 406 and the shaft 432 as illustrated with an arrow indicating a direction of the aft thrust 446. At high speeds (e.g., operational speeds) of the motor 410, the expeller vanes 442 drive the heat exchange fluid inside the pump 400 forward toward the pump outlet 408, and the fluid generates a forward thrust 448 on the impeller 406 and the shaft 432 as illustrated with an arrow indicating a direction of the forward thrust 448. The thrust bearing system 440 is included in the pump 400 to support the aft and forward thrusts 446, 448 of the shaft 432.

In some examples, the pump 400 includes an example outer flowline 450 that diverges from the pump outlet 408 to provide sCO2 as a working medium to the thrust bearing system 440 and to support the thrust disc 438 when pressurized. Additionally or alternatively, the outer flowline 450 diverges from the fluid conduit 402 and/or the expeller vanes 442. The example outer flowline 450 can circumvent one or more of the motor housing 412, the aft bearing housing 416, the forward bearing housing 422, and/or the backplate 426 to access the thrust bearing system 440.

In some examples, the pump 400 includes an example inner flowline 452 that diverges from the expeller vanes 442 to provide sCO2 as a working medium to the thrust bearing system 440 and to support the thrust disc 438 when pressurized. Additionally or alternatively, the inner flowline 452 diverges from the fluid conduit 402 and/or the pump outlet 408. The example inner channel can pass through one or more of the motor housing 412, the aft bearing housing 416, the forward bearing housing 422, and/or the backplate 426 to access the thrust bearing system 440.

The outer and inner flowlines 450, 452 of FIG. 4 are illustrated as example configurations to reflect general locations of the flowlines and directions of the flow. Although both the outer and inner flowlines 450, 452 are illustrated in FIG. 4, only one may be included in the pump 400 to achieve a same function. The pump 400 can be configured with the outer flowline 450 to reduce complication during fabrication and/or assembly and to reduce risk of internal leakages. The pump 400 can be configured with the inner flowline 450 to reduce an amount of space the pump 400 occupies. Also illustrated in FIG. 4 are first return flowline(s) 454 and second return flowline(s) 456 to generally depict exit points and flow directions of the working fluid from the thrust bearing system 440 to the expeller vanes 442. Further details of the outer flowline 450, the inner flowline 452, the first return flowline 454, and the second return flowline 456 are described below with reference to FIG. 5.

In the illustrated example of FIG. 4, the thrust disc 438 and the thrust bearing system 440 are designed such that forward and aft bearing capacities are not dynamically adjusted to account for fluctuations between aft and forward thrusts 446, 448. In other words, there may be no dynamic systems in the thrust bearing system 440 to dynamically change axial support a forward or an aft side of the thrust disc 438 in response transition(s) from the aft thrust 446 to the forward thrust 448 and vice versa. Examples disclosed herein include apparatus and systems to dynamically support axial loads in forward and/or aft directions (e.g., aft and/or forward thrusts 446, 448) based on a fluid pressure changes on forward and aft sides of a thrust disc.

Figure 5:
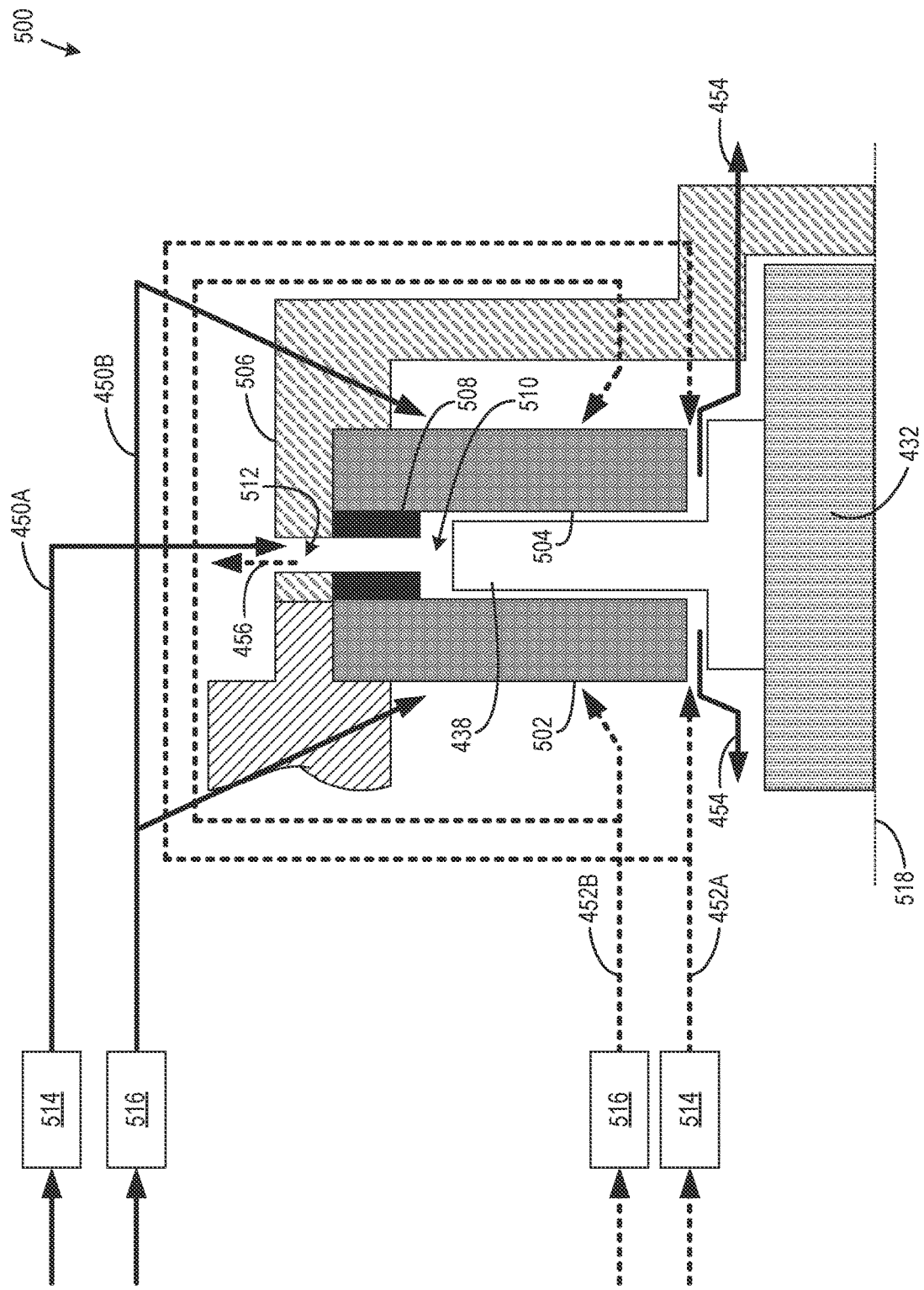
FIG. 5 is a schematic illustration of an example thrust bearing system.

FIG. 5 is a schematic illustration of a thrust bearing system 500 that can be used in the pump 400 illustrated in FIG. 4. The thrust bearing system 500 includes the thrust disc 438 fixedly coupled to the impeller shaft 432 and interposed between a forward thrust pad 502 and an aft thrust pad 504. The thrust bearing system 500 includes a thrust bearing housing 506 to rigidly affix the forward and aft thrust pads 502, 504 in place. The forward and aft thrust pads 502, 504 are spaced at a distance by a spacer 508 to define a bearing chamber 510 where the fluid can collect and become pressurized by the rotating thrust disc 438. The thrust bearing housing 506 includes an opening 512 (e.g., a hole, slot, port, etc.) to permit the fluid to enter the bearing chamber 510, become pressurized on forward and aft sides of the thrust disc 438, and bear axial loads of the shaft 432. In some examples, the thrust bearing system 500 and example systems disclosed herein include a spring-loaded foil in the bearing chamber 510 between the thrust disc 438 and the forward and aft thrust pads 502, 504 to support axial loads of the shaft 432 during startup operations of the pump 400 before the pressurized working fluid solely supports the thrust disc 438.

The illustration of FIG. 5 depicts a primary outer flowline 450A to provide the working fluid (e.g., sCO2) to the thrust disc 438 via the opening 512 (distal to a central axis 518 of the shaft 432). The example thrust bearing system 500 also includes a secondary outer flowline 450B to illustrate how the fluid is provided to the forward and/or aft thrust pads 502, 504. As mentioned previously, the outer flowlines 450A-B can circumvent the exterior of the pump 400 around one or more of the motor housing 412, the aft bearing housing 416, the end cap 420, and/or the forward bearing housing 422. In some examples, the outer flowlines 450A-B exit the pump 400 at the pump outlet 408 and re-enter at the aft bearing housing 416 and/or the end cap 420. Although one primary outer flowline 450A and one secondary outer flowline 450B are illustrated in FIG. 5, the thrust bearing system 500 can include a plurality of (e.g., two, four, ten, etc.) primary and secondary outer flowlines 450A-B. In general, the number of primary outer flowlines 450A corresponds to the number of secondary flowlines 450B, however, in some examples, the inequal numbers of primary and second flowlines 450A-B are utilized.

When the outer flowlines 450A-B are included, the thrust bearing system 500 can also include the first return flowline(s) 454 to transmit the working fluid back to the expeller vanes 442. The first return flowline(s) 454 exit the bearing chamber 510 proximal to the central axis 518 of the shaft 432. Although two of the first return flowlines 454 are illustrated in FIG. 5, there can be a plurality (e.g., four, eight, 12, etc.) of first return flowlines 454 included in the thrust bearing system 500. Generally, when the outer flowlines 450A-B are utilized, the thrust bearing system 500 includes at least one of the first return flowline(s) 454 on the forward side of the thrust disc 438 and at least one of the first return flowline(s) 454 on the aft side of the thrust disc 438. In some examples, the first return flowlines 454 illustrated in FIG. 5 originate as distinct flowlines that converge at some point downstream of the thrust bearing system 500 and upstream of the expeller vanes 442. In some examples, the first return flowlines 454 remain distinct and separated between the thrust bearing system 500 and the expeller vanes 442.

The illustration of FIG. 5 also depicts a primary inner flowline 452A to provide the fluid to the thrust disc 438 via gaps and/or openings proximal to the central axis 518 of the shaft 432. Furthermore, the example thrust bearing system 500 also includes a secondary inner flowline 452B to illustrate how the fluid is provided to the forward and/or aft thrust pads 502, 504. As mentioned previously, the inner flowlines 452A-B can pass through the interior of the pump 400 through and/or between one or more of the motor 410, the motor housing 412, the aft bearing housing 416, the end cap 420, and/or the forward bearing housing 422. Although one primary inner flowline 452A and one secondary inner flowline 452B are illustrated in FIG. 5, the thrust bearing system 500 can include a plurality of (e.g., two, four, ten, etc.) primary and secondary inner flowlines 452A-B. In general, the number of primary inner flowlines 452A corresponds to the number of secondary inner flowlines 452B, however, in some examples, the inequal numbers of primary and secondary inner flowlines 452A-B are utilized.

When the inner flowlines 452A-B are included, the thrust bearing system 500 can also include the second return flowline(s) 456 to transmit the working fluid back to the expeller vanes 442. The second return flowline(s) 456 exit the bearing chamber 510 distal to the central axis 518 of the shaft 432 via the opening 512. Although one of the second return flowline(s) 456 is illustrated in FIG. 5, there can be a plurality (e.g., two, four, 12, etc.) of second return flowlines 456 included in the thrust bearing system 500. Generally, when the inner flowlines 452A-B are utilized, the thrust bearing system 500 includes at least one of the second return flowline(s) 456 at respective openings 512 disposed on the spacer 508 circumferentially distributed about the central axis 518.

It should be appreciated that the secondary outer and inner flowlines 450B, 452B are included in FIG. 5 merely to illustrate possible configurations of examples disclosed herein and do not contribute to the functionality of the thrust bearing system 500. Furthermore, as mentioned below, the secondary inner or outer flowlines 450B, 452B are applicable to example dynamic thrust bearing systems illustrated in and described in reference to FIGS. 6-10 but not to those illustrated in and described in reference to FIGS. 11-15.

The example illustration of FIG. 5 includes a primary heat exchanger 514 and a secondary heat exchanger 516 to adjust mass flowrates in the primary and secondary outer flowlines 450A, 450B, respectively. In some examples, the primary and secondary heat exchangers 514, 516 are included to adjust mass flowrates in the primary and secondary inner flowlines 452A, 452B. In some examples, only the second heat exchanger 516 is included without the primary heat exchanger 514 to adjust a mass flowrate of fluid to the forward and aft thrust pads 502, 504. The primary and secondary heat exchangers 514, 516 can be heat source heat exchangers that transfer heat from another component of the example aircraft 10 or the thermal management system 200 to the fluid. In some examples, increasing the temperature of the flowing fluid (e.g., sCO2) also increases the pressure of the fluid, and in turn, increases the mass flowrate of the fluid.

Although both the outer flowlines 450A-B and the inner flowlines 452A-B are illustrated in FIG. 5, the pump 400, the thrust bearing system 500, and/or example dynamic thrust bearing systems disclosed herein can function with either the outer flowlines 450A-B or the inner flowlines 452A-B without including the other. Both the outer flowlines 450A-B, and inner flowlines 452A-B are illustrated in FIG. 5 to exemplify that outer or inner configurations are possible in examples disclosed herein. Although the example dynamic thrust bearing systems described below are illustrated and referenced as being used with one or more of the outer flowlines 450A-B, alternative examples of the dynamic thrust bearing systems can be used with one or more of the inner flowlines 452A-B.

Figure 6:
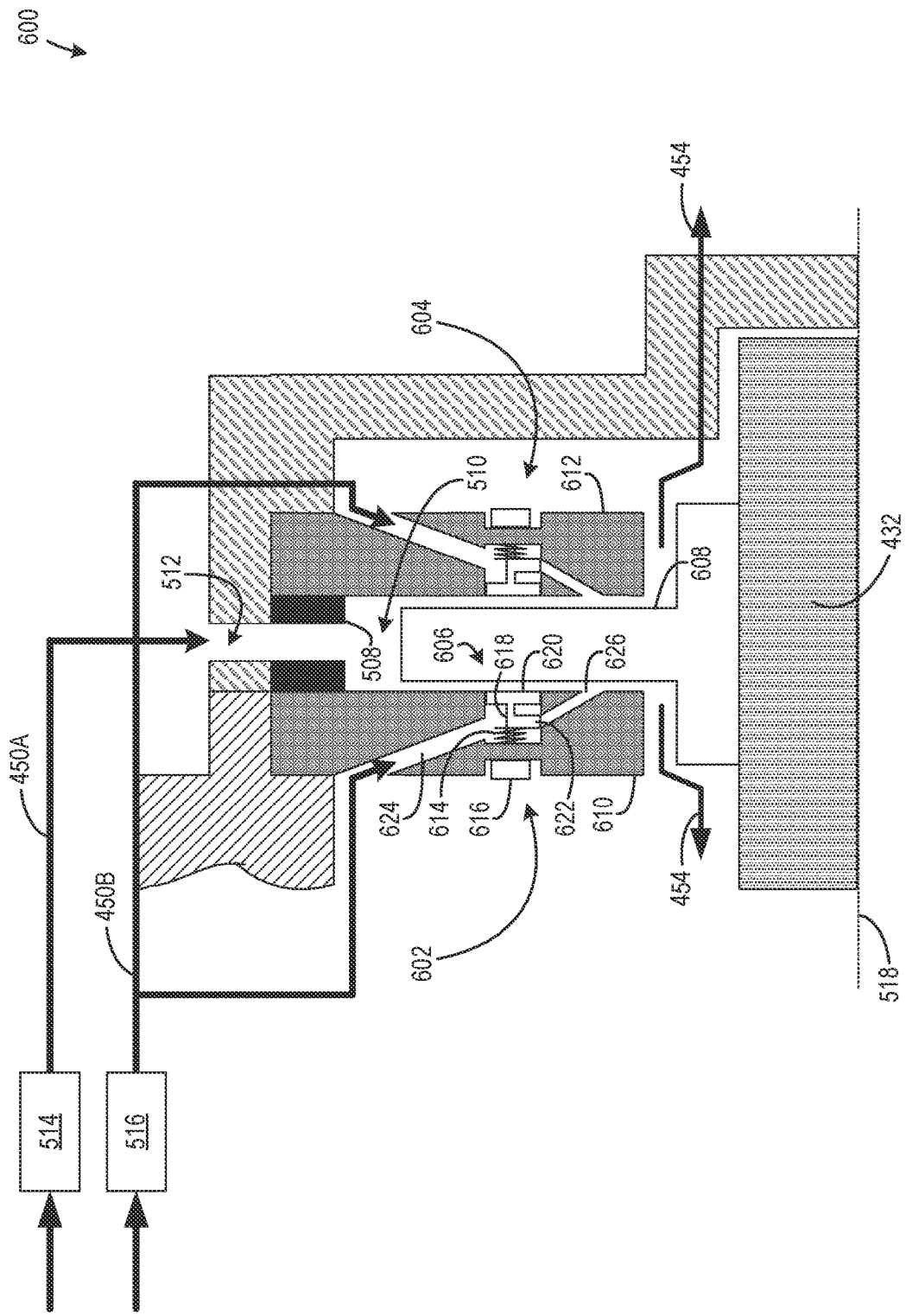
FIG. 6 is a schematic illustration of an example first dynamic thrust bearing system in accordance with the teachings disclosed herein.

FIG. 6 is a schematic illustration of an example first dynamic thrust bearing system 600 ("first system 600") including a forward spring-loaded assembly 602 and an aft spring-loaded assembly 604 to dynamically adjust axial load bearing based on axial displacement of the shaft 432. The forward and aft spring-loaded assemblies 602, 604 are hydraulically actuated systems integrated into the first system 600 to retract a plunger 606 in response to increased pressures on forward and aft sides of a thrust disc 608. In some examples, the thrust disc 608 is of the same design and/or structure as the thrust disc 438 of FIGS. 4 and 5. The thrust disc 608 is coupled to the shaft 432, and the first system 600 includes a forward thrust pad 610 and an aft thrust pad 612 to support axial loads transferred from the shaft 432 via the thrust disc 608. The first system 600 further includes a spring 614, a stopper 616, a plunger shaft 618, a distal head 620, a proximal head 622, an upper feed hole 624, and a bottom feed hole 626. It should be appreciated that although the plunger 606 and other parts (e.g., the spring 614, the stopper 616, the plunger shaft 618, the distal head 620, the proximal head 622, the upper feed hole 624, and the bottom feed hole 626) are described herein in reference to the forward spring-loaded assembly 602, the references and descriptions of those parts can apply to corresponding parts (not numbered) associated with the aft spring-loaded assembly 604.

The example first system 600 of FIG. 6 includes the spring 614 attached to the forward thrust pad 610 and the proximal head 622 to oppose a first distributed force generated by the fluid pressure forward of the thrust disc 608. The spring 614 can hold the plunger 606 in a closed position when a combined force (described below) does not satisfy (is less than) a first threshold. The spring 614 generates a spring force on the proximal head 622 that is opposite in direction to the first distributed force generated by the fluid pressure forward of the thrust disc 608 and acting on the distal head 620. In other words, the spring 614 applies the spring force in the aft direction, and the fluid pressure in the bearing chamber 510 applies the first distributed force on the plunger 606 in the forward direction. The stiffness of the spring 614 partially contributes to the combined force and can at least partially determine a value of the first threshold. The spring force (stiffness) of the spring 614 is at least partially based on material(s) (e.g., low-alloy steel, cold formed steel, etc.) and/or a number of coils of the spring 614.

The example first system 600 of FIG. 6 includes the stopper 616 attached to the plunger shaft 618 to prevent the spring 614 from forcing the plunger 606 past a boundary of the forward thrust pad 610. Thus, the stopper 616 interacts with a recessed portion of the forward thrust pad 610 such that an aft surface of the distal head 620 is substantially coplanar with an aft surface of the forward thrust pad 610. As used herein, "substantially coplanar" refers to two parallel surfaces and/or planes that are on a same plane within some tolerance(s) (e.g., +/−0.10 inches, etc.) due to machining defects, material wear, and/or other sources of dimensional imperfections. In some examples, the stopper 616 is manufactured from a same piece of raw material as the plunger 606. In some examples, the stopper 616 is additively manufactured with the plunger 606 to form a single cohesive structure. In some examples, the stopper 616 is manufactured as a separate part that is fixed to the plunger shaft 618 via fasteners (e.g., adhesives, bolts, interference fits, etc.).

The example first system 600 of FIG. 6 includes the proximal head 622 to obstruct the bottom feed hole 626 when the plunger 606 is in the closed position. Thus, when the plunger 606 is in the closed position, the fluid entering the upper feed hole 624 via the secondary flowline 450B applies a second distributed force on the forward side of the distal head 620. Therefore, the first distributed force acts in an opposite direction from the second distributed force and the spring force. Furthermore, the combined force can be based on a sum of the second distributed force and the spring force. As mentioned previously, the first threshold is based on the combined force and can be modified based on changes to the spring properties (e.g., stiffness, etc.), the area/diameter of the distal head 620, the diameter of the shaft 618, etc. When the shaft 432 moves far enough forward such that the first distributed force satisfies (e.g., is greater than or equal to) the first threshold, then the plunger 606 retracts. When the plunger 606 retracts, the proximal head 622 likewise retracts and allows the fluid entering the upper feed hole 624 to flow through the bottom feed hole 626 and into the bearing chamber 510 at the forward side of the thrust disc 608. Additionally or alternatively, a displacement threshold of the shaft 432 (e.g., 0.005 in, 0.008 in, 0.020 in, etc.) can define a condition in which the plunger 606 retracts and permits the fluid to flow into the bearing chamber 510.

The first system 600 includes the primary and secondary heat exchangers 514, 516 to adjust, control, and/or define a mass flowrate of the fluid entering the bearing chamber 510, the opening 512, and/or the upper feed hole 624. In some examples, just the secondary heat exchanger 516 is included in the first system 600 to determine the mass flowrate of the fluid entering the upper feed hole 624 and the bearing chamber 510 forward of the thrust disc 608. Thus, the mass flowrate output of the secondary heat exchanger 516 can define how quickly the axial position of the thrust disc 608 stabilizes and recenters between the forward and aft thrust pads 610, 612. The output flowrate of the secondary heat exchanger 516 can be adjusted based on a temperature of the heat source, a configuration of the secondary heat exchanger 516, etc. For example, the secondary heat exchanger 516 can be a shell and tube heat exchanger wherein the number of tubes determines the amount of heat transfer to the fluid and, thus, the output temperature and flowrate of the fluid.

In some examples, the forward and aft thrust pads 610, 612 are manufactured using additive manufacturing to precisely fabricate the dimensions and configurations of the upper feed hole 624, the bottom feed hole 626 etc. For example, the forward and aft thrust pads 610, 612 can be manufactured using direct metal laser sintering (DMLS), selective laser sintering (SLS), selective heat sintering (SHS), electron beam melting (EBM), direct metal laser melting (DMLM), binder jetting, direct energy deposit (DED), etc.

As mentioned previously, during operation of the pump 400, the thrust disc 608 rotates with the shaft 432 and pressurizes the fluid in the bearing chamber 510. When the pump 400 operates at low speeds, the shaft 432 and thrust disc 608 can move aft and increase the fluid pressure on the aft side of the thrust disc 608. Alternatively, when the pump 400 operates at high speeds, the shaft 432 and thrust disc 608 can move forward and increase the fluid pressure on the forward side of the thrust disc 608. For example, at high speeds, the first distributed force may satisfy (e.g., may be greater than or equal to) the first threshold. In some examples, when the first distributed force satisfies the first threshold, the plunger 606 retracts and the fluid enters the bearing chamber 510 at a forward side of the thrust disc 608. Thus, at high speeds, the forward fluid pressure in the bearing chamber 510 can increase and cause the bottom feed hole 626 to open. As fluid enters the bearing chamber 510 via the bottom feed hole 626, the forward fluid pressure further increases, counteracts the forward thrust (e.g., the forward thrust 448), and moves the shaft 432 in the aft direction. Furthermore, the secondary heat exchanger 516 can cause the fluid to flow through the bottom feed hole 626 at a desired flowrate that moves the thrust disc 608 back to a central position in the bearing chamber 510. In some examples, the secondary heat exchanger 516 can increase the flowrate through the bottom feed hole 626 to such a value that the fluid can enter the bearing chamber 510 despite the increased pressure therein. Therefore, the first dynamic thrust bearing system 600 can balance out axial movements of the shaft 432 during real time operation of the pump 400.

FIG. 7 is magnified view 700 of the forward spring-loaded assembly 602. FIG. 8 is a schematic isometric view 800 of the plunger 606 of FIG. 6. The magnified view 700 includes a first arrow 702, a second arrow 704, and a third arrow 706 to illustrate directions and/or general locations of the first distributed force, the second distributed force, and the spring force described above. As shown in magnified view 700, the first distributed force acts on a first side of the distal head 620 and away from the thrust disc 608 of FIG. 6, the second distributed force acts on a second side (opposite the first side) of the distal head 620 and toward the thrust disc 608, and the spring force (third arrow 706) acts on the proximal head 622 and/or the plunger shaft 618 and toward the thrust disc 608. In the forward spring-loaded assembly 602, the first side of the distal head 620 is the aft side and the second side of the distal head 620 is the forward side. However, in the aft spring-loaded assembly 604 of FIG. 6, the first side of the distal head 620 is the forward side and the second side of the distal head is the aft side.

As the fluid flows into the bearing chamber 510, a first pressure (P1) builds on the forward and aft sides of the rotating thrust disc 608. The first distributed force can be calculated as the first pressure multiplied by the area of the first side of the distal head 620. Since the distal head 620 is a circle, the area of the first side of the distal head 620 can be calculated using Equation 1 below.

$$A_1 = \pi (d_1/2)^2. \quad \text{(Equation 1)}$$

In Equation 1, "$A_1$" is the area of the first side of the distal head 620, and "$d_1$" is a distal head diameter 708. Thus, the first distributed force is based on the area of the first side of the distal head 620, and more specifically, based on the distal head diameter 708.

As the fluid flows from the secondary outer flowline 450B into the upper feed hole 624, a second pressure (P2) builds on the second side of the distal head 620. The second distributed force can be calculated as the second pressure multiplied by the area of the second side of the distal head 620. The area of the second side of the distal head 620 can be calculated using Equation 2 below.

$$A_2 = A_1 - \pi (d_2/2)^2. \quad \text{(Equation 2)}$$

In Equation 2, "$A_2$" is the area of the second side of the distal head 620, and "$d_2$" is a plunger shaft diameter 710. Thus, the first distributed force is based on the area of the first side of the distal head 620, and more specifically, based on the distal head diameter 708 and the plunger shaft diameter 710.

As described previously, the combined force can be based on the sum of the second distributed force and the spring force. The plunger retracts when the first distributed force satisfies the first threshold. The first threshold can be determined based on the combined force, and more specifically, based on the distal head diameter 708, the plunger shaft diameter 710, a number of coils in the spring 614, and material(s) of the spring 614. In some examples, the first threshold is further defined based on the temperature and/or flowrate output of the primary heat exchanger 514 and/or the secondary heat exchanger 516. Thus, the first threshold can be adjusted based on adjustments to one or more of the distal head diameter 708, the plunger shaft diameter 710, the number of coils in the spring 614, and the material(s) of the spring 614.

Figure 9:
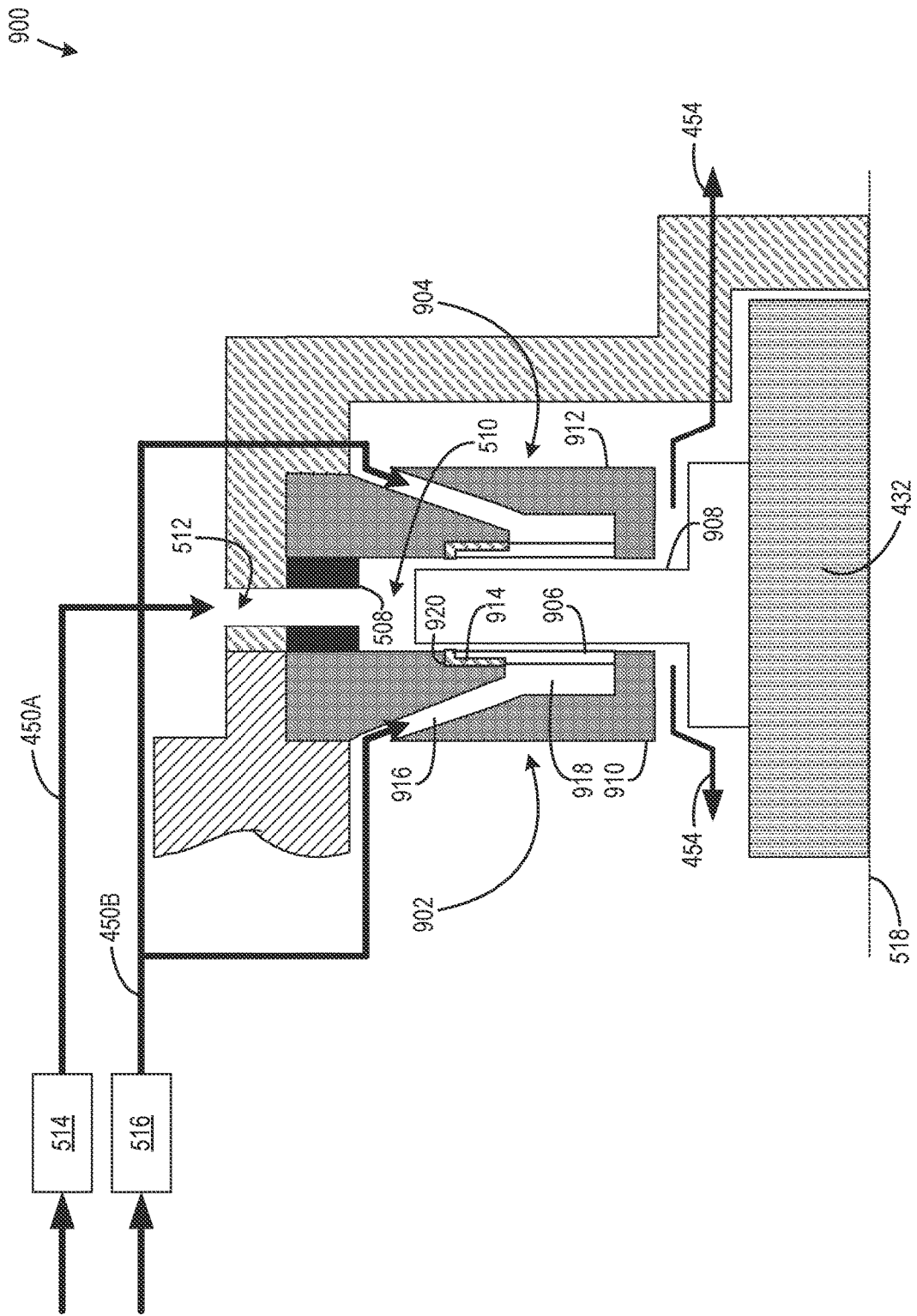
FIG. 9 is a schematic illustration of an example second dynamic thrust bearing system in accordance with the teachings disclosed herein.

FIG. 9 is a schematic illustration of an example second dynamic thrust bearing system 900 ("second system 900) including a forward diaphragm assembly 902 and an aft diaphragm assembly 904 to dynamically adjust the axial load support based on axial displacement of the shaft 432. The forward and aft diaphragm assemblies 902, 904 are hydraulically actuated systems integrated into the second system 900 to open a diaphragm 906 in response to increased pressures on a forward side of a thrust disc 908. In some examples, the thrust disc 908 is of the same design and/or structure as the thrust disc 438 of FIGS. 4 and 5 and/or the thrust disc 608 of FIG. 6.

The thrust disc 908 is coupled to the shaft 432, and the second system 900 includes a forward thrust pad 910 and an aft thrust pad 912 to support axial loads transferred from the shaft 432 via the thrust disc 908. The second system 900 further includes a fastener 914, an upper feed hole 916, and a diaphragm chamber 918. It should be appreciated that although the diaphragm 906 and other parts (e.g., the fastener 914, the upper feed hole 916, and the diaphragm chamber 918) are described herein in reference to the forward diaphragm assembly 902, the references and descriptions of those parts can apply to corresponding parts (not numbered) associated with the aft diaphragm assembly 904.

The second system 900 illustrated in FIG. 9 includes the diaphragm 906 to obstruct and/or permit the fluid from entering the bearing chamber 510 via the upper feed hole 916 and diaphragm chamber 918. The diaphragm 906 is fixed to the forward thrust pad 910 via the fastener 914. The example fastener 914 fixedly joins the diaphragm 906 to a socket 920 in cantilevered fashion. In some examples, the socket 920 is dimensioned to a depth such that an aft surface of the diaphragm 906 is substantially coplanar with an aft surface of the forward thrust pad 910. Thus, in such examples, the socket 920 receives the diaphragm 906 so that the diaphragm 906 does not protrude into the bearing chamber 510. In some examples, the diaphragm 906 is a circular piece of sheet metal of one or more materials (e.g., aluminum alloys, steel alloys, copper alloys, etc.). In some examples, the fastener 914 is a brazed weld including metallic material(s) (e.g., silver, gold, palladium, etc.) melted into the socket 920 (e.g., a slot, hole, indentation, etc.) to couple the diaphragm 906 and the socket 920. In the example illustration of FIG. 9, the fastener 914 and the socket 920 are positioned at an end of the diaphragm 906 that is distal to the central axis 518 of the shaft 432. Additionally or alternatively, the fastener 914 and the socket 920 are positioned at an end of the diaphragm 906 that is proximal to the central axis 518 of the shaft 432. In some examples, when the primary and secondary inner flowlines 452 A-B are included in the second system 900, the fastener 914 and the socket 920 are positioned at the proximal ends of the diaphragm 906.

The diaphragm 906 can bend in response to axial movements of the shaft 432. In some examples, the forward thrust of an impeller (e.g., the impeller 406 of FIG. 4) displaces the shaft 432 and thrust disc 908 forward, which increases the fluid pressure in the bearing chamber 510 forward of the thrust disc 908 and generates a first distributed force on an aft side of the diaphragm 906.

Similar to the first system 600, a second distributed force is applied to a forward side of the diaphragm 906 due to fluid pressures in the diaphragm chamber 918. Similar to the combined force described in connection with FIGS. 6-8, the second distributed force can define a second threshold. The secondary heat exchanger 516 can increase the temperature, pressure, and/or flowrate of the fluid in the secondary outer flowline 450B, the upper feed hole 916, and the diaphragm chamber 918. Thus, the secondary heat exchanger 516 can adjust the second distributed force as well as the second threshold. In some examples, when the first distributed force satisfies (e.g., is greater than or equal to) the second threshold, the diaphragm 906 bends forward, and the fluid enters the bearing chamber 510 at a forward side of the thrust disc 908. Thus, at high speeds, the forward fluid pressure in the bearing chamber 510 can increase and cause the diaphragm chamber 918 to open. As fluid enters the bearing chamber 510 via the diaphragm chamber 918, the forward fluid pressure further increases, counteracts the forward thrust (e.g., the forward thrust 448), and moves the shaft 432 in the aft direction. Furthermore, the secondary heat exchanger 516 can cause the fluid to flow through the diaphragm chamber 918 at a desired flowrate that moves the thrust disc 908 back to a central position in the bearing chamber 510. In some examples, the secondary heat exchanger 516 can increase the flowrate through the diaphragm chamber 918 to such a value that the fluid can enter the bearing chamber 510 despite the increased pressure therein. Therefore, the second dynamic thrust bearing system 900 can balance out axial movements of the shaft 432 during real time operation of the pump 400.

Figure 10:
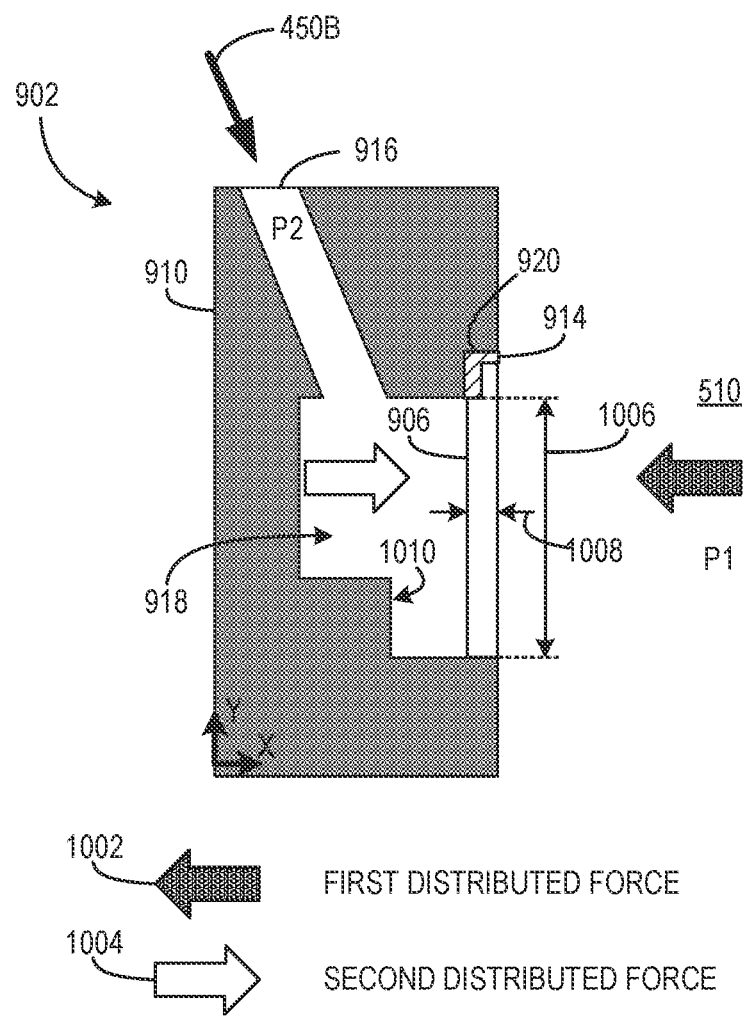
FIG. 10 is a magnified view of a portion of the example second dynamic thrust bearing system in accordance with the teachings disclosed herein.

FIG. 10 is a magnified view 1000 of the forward diaphragm assembly 902. The magnified view 1000 includes a first arrow 1002 and a second arrow 1004 to illustrate directions and/or general locations of the first distributed force and the second distributed force described above. As shown in the magnified view 1000, the first distributed force acts on a first side of the diaphragm 906 and away from the thrust disc 908 of FIG. 9, and the second distributed force acts on a second side (opposite the first side) of the diaphragm 906 and toward the thrust disc 908. In the forward diaphragm assembly 902, the first side of the diaphragm 906 is the aft side and the second side of the diaphragm 906 is the forward side. However, in the aft diaphragm assembly 904 of FIG. 9, the first side of the diaphragm 906 is the forward side and the second side of the distal head is the aft side.

As the thrust disc 908 rotates and as the fluid flows into the diaphragm chamber 918, the first and second pressures and the first and second distributed forces increase. The values of the first distributed forces can be determined based on a product of the first pressure and the area of a portion of the diaphragm 906 not in contact with the fastener 914. In some examples, the portion of the diaphragm 906 not in contact with the fastener 914 extends from the socket 920 by a diaphragm length 1006. The diaphragm length 1006, a diaphragm width 1008, and a modulus of elasticity (e.g., Young's modulus) of the material(s) of the diaphragm 906 are directly proportional to the amount of deflection the diaphragm 906 experiences when a given amount of force (e.g., point force, distributed force, bending moment, etc.) is applied. In other words, the shorter the diaphragm length 1006, the wider the diaphragm width 1008, and/or the stronger the material(s), the less bending the diaphragm 906 experiences at the given amount of force. Therefore, the second threshold can be at least partially determined and/or adjusted based on the diaphragm length 1006, the diaphragm width 1008, and the material(s) of the diaphragm 906.

The example magnified view 1000 of the forward diaphragm assembly 902 illustrates a protrusion 1010 in the diaphragm chamber 918 to prevent the diaphragm 906 from overbending. In some examples, the diaphragm 906 is composed of material(s) that experience plastic deformation at a given deflection point. When deflection of the diaphragm 906 based on a given first distributed force generates stress(es) greater than or equal to a yield strength of the diaphragm 906, the diaphragm 906 plastically deforms and cannot return to the original closed position (as illustrated in FIG. 10) after the given first distributed force is reduced or removed. If the diaphragm 906 remains open due to plastic deformation, then fluid can continually enter the bearing chamber 510 and excessively move the thrust disc 908 such that damage to the forward and/or aft thrust pads 910, 912 can occur. Thus, the protrusion 1010 is designed to extend from a wall/floor of the diaphragm chamber 918 enough to impede the diaphragm 906 from deflecting to a point at which the stress(es) can plastically deform the diaphragm 906.

In some examples, the forward and aft thrust pads 910, 912 are manufactured using additive manufacturing to precisely fabricate the dimensions and configurations of the upper feed hole 916, the diaphragm chamber 918, the protrusion 1010, the socket 920, etc. For example, the forward and aft thrust pads 910, 912 can be manufactured using direct metal laser sintering (DMLS), selective laser sintering (SLS), selective heat sintering (SHS), electron beam melting (EBM), direct metal laser melting (DMLM), binder jetting, direct energy deposit (DED), etc.

Figure 11:
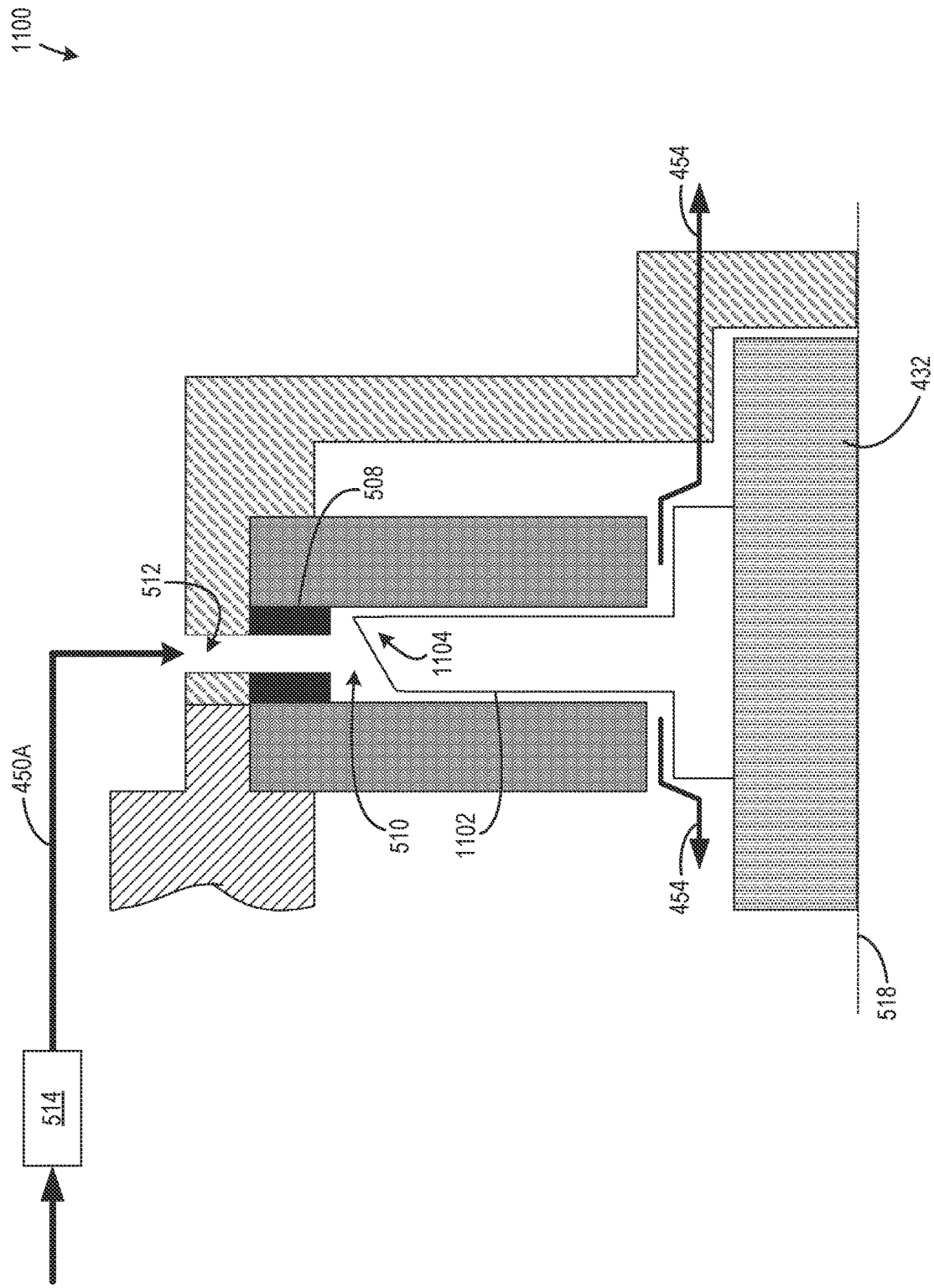
FIG. 11 is a schematic illustration of an example third dynamic thrust bearing system in accordance with the teachings disclosed herein.

FIG. 11 is a schematic illustration of an example third dynamic thrust bearing system 1100 ("third system 1100) including a tapered thrust disc 1102 with a tapered edge 1104 to influence a flow direction of the fluid that enters the bearing chamber 510 via the opening 512. In the example illustration of FIG. 11, the tapered edge 1104 deflects a first portion of the fluid flow to the forward side of the tapered thrust disc 1102 and deflects a second portion (e.g., a lesser portion) of the fluid flow to the aft side of the tapered thrust disc 1102. Since the pump 400 mostly operates at high speeds, the forward thrust 448 is typically greater than the aft thrust 446. Thus, the shaft 432 is typically displaced forward in the pump 400 and the tapered thrust disc 1102 is typically displaced forward in the bearing chamber 510. The tapered edge 1104 causes more of the fluid to flow to the forward side of the tapered thrust disc 1102 to account for the forward displacement of the shaft 432 that occurs more frequently during operation of the pump 400.

FIG. 12 is a schematic illustration of an example fourth dynamic thrust bearing system 1200 ("fourth system 1200) including a shape-memory alloy (SMA) deflector 1202 to influence a flow direction of the fluid that enters the bearing chamber 510 via the opening 512. In the example illustration of FIG. 12, SMA deflector 1202 can direct a first portion of the fluid flow to the forward side of a thrust disc 1204 and direct a second portion of the fluid flow to the aft side of the thrust disc 1204. The SMA deflector 1202 is made of shape-memory materials (e.g., nickel, titanium, etc.) that can assume a first shape at a first temperature and adjust to a second shape when the first temperature changes (e.g., heats) to a second temperature. The fourth system 1200 includes the primary heat exchanger 514 to control a temperature of the fluid that enters the bearing chamber 510 and, thus, controls a position of the SMA deflector 1202.

FIG. 13 is a schematic magnified view 1300 of the SMA deflector 1202 of FIG. 12. The magnified view 1300 depicts a fastener 1302 to affix the SMA deflector 1202 to the spacer 508. In some examples, the fastener 1302 is a brazed weld like the fastener 914 of FIGS. 9 and 10. In some other examples, the fastener 1302 includes adhesive(s) (e.g., epoxy), bolt(s), rivet(s), etc. In some examples, a first portion 1202A of the SMA deflector 1202 that is fixed to the fastener 1302 has a smaller area than a second portion 1202B of the SMA deflector 1202. In other words, in some examples, the second portion 1202B of the SMA deflector 1202 extends circumferentially around the central axis 518 of the shaft 432, beyond the opening 512 by some amount, and around a circumference of the bearing chamber 510 and the thrust disc 1204.

The second portion 1202B of the example SMA deflector 1202 can move between a neutral position 1304, a forward position 1306, and an aft position 1308 based on the temperature of the fluid in the bearing chamber 510. In some examples, when the pump 400 operates at low speeds, the primary heat exchanger 514 reduces the temperature of fluid to a first temperature (e.g., 305, 310, 315 Kelvin (K), etc.) to cause the position of the SMA deflector 1202 to change to the aft position 1308. In some examples, when the pump 400 operates at high speeds, the primary heat exchanger 514 increases the temperature of fluid to a second temperature (e.g., 325, 3330, 350 Kelvin (K), etc.) to cause the position of the SMA deflector 1202 to change to the forward position 1306. The primary heat exchanger 514 of FIG. 12 can be controlled by an example proportional controller to adjust a temperature output of the primary heat exchanger 514 based on the speed of the motor 410 in the pump 400.

FIG. 14 is a schematic illustration of an example fifth dynamic thrust bearing system 1400 ("fifth system 1400") to direct the flow of the working fluid (e.g., sC02) to a forward or aft side of a thrust disc 1402 based on a position of the thrust disc 1402. The thrust disc 1402 is coupled to the shaft 432, and the fifth system 1400 includes a forward thrust pad 1404 and an aft thrust pad 1406 to support axial thrust transferred from the shaft 432 via the thrust disc 1402. The thrust disc 1402 of the fifth system 1400 includes a forward channel 1408 and an aft channel 1410 that can direct flow of the fluid to the forward and aft sides of the thrust disc 1402 in response to displacement of the shaft 432 and thrust disc 1402. The example fifth system 1400 includes a forward spacer portion 1412 to define a forward portion of the opening 512 and an aft spacer portion 1414 to define an aft portion of the opening 512. The forward and aft spacer portions 1412, 1414 further define a central portion of the opening 512. The thrust disc 1402 of the fifth system 1400 includes ridges (described below) that are positioned on a circumferential surface of the thrust disc 1402, protrude radially outward relative to the central axis 518 of the shaft 432, and enable the thrust disc 1402 with functionalities similar to a labyrinth seal. It should be appreciated that although the forward and aft channels 1408, 1410 are illustrated in FIG. 14, the forward and aft channels 1408, 1410 are not included in a same cross-sectional plane as is illustrated in FIG. 14. Rather, the forward channel 1408 would be located in a different cross-sectional plane than the aft channel 1410 as described below.

FIGS. 15A-C are schematic cross-sectional views of the fifth system 1400 including a first cross-sectional view 1500A, a second cross-sectional view 1500B, and a third cross-sectional view 1500C. The first cross-sectional view 1500A shows a first cross-section of the fifth system 1500 that includes the forward channel 1408 in the thrust disc 1402. FIG. 14 illustrates a central position of the thrust disc 1402 in the bearing chamber 510. The first cross-sectional view 1500A illustrates a forward displacement of the thrust disc 1402 in the bearing chamber 510 due to the forward thrust 448 of the shaft 432. The second cross-sectional view 1500B illustrates an aft displacement of the thrust disc 1402 in the bearing chamber 510 due to the aft thrust 446 of the shaft 432.

When the thrust disc 1402 is in a central position (shown in FIG. 14), a central ridge 1502 obstructs the central portion of the opening 512 such that the fluid diverts to the forward and aft sides of the thrust disc 1402 (via forward and aft portions of the opening 512) substantially equally (e.g., within +/−1 kilogram per second (kg/s)).

As illustrated in FIG. 15A, when the thrust disc 1402 moves forward in the bearing chamber 510, a forward ridge 1504 obstructs and/or inhibits flow through the forward portion of the opening 512. A first arrow 1508 illustrates the flow direction of the fluid through the central portion when the thrust disc 1402 is in the forward position. As the fluid flows through the central portion and into the forward channel 1408, the fluid flows to a forward side of the thrust disc 1402, increases the fluid pressure in the bearing chamber 510 at the forward side of the thrust disc 1402, and causes the thrust disc 1402 to return to the central position of FIG. 14.

The second cross-sectional view 1500B shows a second cross-section of the fifth system 1500 that includes the aft channel 1410 in the thrust disc 1402. The second cross-sectional view 1500B illustrates an aft displacement of the thrust disc 1402 in the bearing chamber 510 due to the aft thrust 446 of the shaft 432. As illustrated in FIG. 15B, when the thrust disc 1402 moves aft in the bearing chamber 510, an aft ridge 1506 obstructs and/or inhibits flow through the aft portion of the opening 512. A second arrow 1510 illustrates the flow direction of the fluid through the central portion when the thrust disc 1402 is in the aft position. As the fluid flows through the central portion and into the aft channel 1410, the fluid flows to an aft side of the thrust disc 1402, increases the fluid pressure in the bearing chamber 510 at the aft side of the thrust disc 1402, and causes the thrust disc 1402 to return to the central position of FIG. 14.

The third cross-sectional view 1500C shows a cross-section of a portion of the thrust disc 1402 from a forward perspective or an aft perspective. The illustrated example of FIG. 15C shows the portion of the thrust disc 1402 that has been bisected along a reference line 1416 of FIG. 14. As shown in FIG. 15C, the thrust disc 1402 includes multiple forward and aft channels 1408, 1410 that follow an alternating pattern. Thus, the fifth system 1400 includes the thrust disc 1402 with the forward channels 1408, the aft channels 1410, the forward spacer portion 1412, the aft spacer portion 1414, the central ridge 1502, the forward ridge 1504, and the aft ridge 1506 to be self-stabilizing and to dynamically adjust the position of the thrust disc 1402 and the shaft 432 in response to unbalanced forward and aft thrusts. In some examples, the thrust disc 1402 is manufactured using additive manufacturing to precisely fabricate the dimensions and configurations of the forward channels 1408, the aft channels 1410, the central ridge 1502, the forward ridge 1504, and the aft ridge 1506. For example, the thrust disc 1402 can be manufactured using direct metal laser sintering (DMLS), selective laser sintering (SLS), selective heat sintering (SHS), electron beam melting (EBM), direct metal laser melting (DMLM), binder jetting, direct energy deposit (DED), etc.

Example thrust bearing apparatus, systems, and articles of manufacture for dynamically supporting shafts in pumps are disclosed herein. As a pump (e.g., a centrifugal pump) operates, an impeller/expeller of the pump experiences forward and aft thrusts which can cause an impeller shaft to axially move forward and aft by an amount (e.g., 0.001 in, 0.005 in, 0.010 in, etc.). Movements of the impeller shaft and/or prolonged rotation of the impeller shaft in displaced positions can cause the impeller shaft and/or parts coupled thereto to interfere with other internal parts (e.g., bearings, housings, motor(s), etc.) of the pump, which can cause damage to the pump and/or the internal parts and can cause energy losses due to friction forces at the interferences. Example dynamic thrust bearing systems disclosed herein reduce damage to the pump through reduced axial movement of the impeller shaft. Example dynamic thrust bearing systems disclosed herein increase the energy efficiency of the pump through dynamic adjustment of the axial position of the impeller shaft in response to axial displacements of the impeller shaft.

Example methods, apparatus, systems, and articles of manufacture to dynamically support axial thrust in pumps are disclosed herein. Further examples and combinations thereof include the following:

Example 1 includes a thrust bearing system to dynamically support axial thrust in a pump, the thrust bearing system comprising a thrust disc coupled to an impeller shaft, the thrust disc protruding radially outward from the impeller shaft, the impeller shaft coupled to an impeller, the impeller including impeller vanes on a forward side of the impeller and expeller vanes on an aft side of the impeller, a first thrust pad coupled to a body of the pump, the first thrust pad protruding radially inward toward the impeller shaft, the first thrust pad positioned on a forward side of the thrust disc, a second thrust pad coupled to the body of the pump, the second thrust pad protruding radially inward toward the impeller shaft, the second thrust pad positioned on an aft side of the thrust disc, and a spring-loaded assembly integrated into the first and second thrust pads, the spring-loaded assembly connected to a pump outlet via a first flowline, the first flowline to transmit a working fluid from the pump outlet to the forward side of the thrust disc or the aft side of the thrust disc based on a position of the spring-loaded assembly.

Example 2 includes the thrust bearing system of any preceding clause, further including a first heat exchanger connected to the first flowline, the first heat exchanger to adjust a temperature, a pressure, and a mass flow rate of the working fluid entering the spring-loaded assembly.

Example 3 includes the thrust bearing system of any preceding clause, further including a spacer defining a bearing chamber between the first and second thrust pads, the spacer including an opening.

Example 4 includes the thrust bearing system of any preceding clause, further including a second flowline to transmit the working fluid from the pump outlet to the bearing chamber, and a third flowline to return the working fluid from the bearing chamber to the expeller vanes.

Example 5 includes the thrust bearing system of any preceding clause, further including a second heat exchanger connected to the second flowline, the second heat exchanger to adjust a temperature, a pressure, and a mass flow rate of the working fluid entering the bearing chamber.

Example 6 includes the thrust bearing system of any preceding clause, wherein the second flowline is connected to the bearing chamber at a first point distal to a central axis of the impeller shaft, the first point corresponding to the opening.

Example 7 includes the thrust bearing system of any preceding clause, wherein the third flowline is connected to the bearing chamber at second points proximal to the central axis of the impeller shaft, the second points positioned between the first and second thrust pads and the impeller shaft.

Example 8 includes the thrust bearing system of any preceding clause, wherein the second flowline is connected to the bearing chamber at second points proximal to a central axis of the impeller shaft, the second points positioned between the first and second thrust pads and the impeller shaft.

Example 9 includes the thrust bearing system of any preceding clause, wherein the third flowline is connected to the bearing chamber at a first point distal to the central axis of the impeller shaft, the first point corresponding to the opening.

Example 10 includes a thrust bearing system to dynamically support axial thrust in a pump, the thrust bearing system comprising a thrust disc coupled to an impeller shaft, a first thrust pad coupled to a body of the pump, the first thrust pad positioned on a forward side of the thrust disc, a second thrust pad coupled to the body of the pump, the second thrust pad positioned on an aft side of the thrust disc, the first and second thrust pads defining a bearing chamber, and a spring-loaded assembly integrated into the first thrust pad, the spring-loaded assembly to support a forward axial thrust in the pump, the spring-loaded assembly connected to a pump outlet via a first flowline, the first flowline to transmit a working fluid from the pump outlet to the spring-loaded assembly.

Example 11 includes the thrust bearing system of any preceding clause, wherein the spring-loaded assembly is a first spring-loaded assembly, further including a second spring-loaded assembly integrated into the second thrust pad, the second spring-loaded assembly to support aft an axial thrust in the pump.

Example 12 includes the thrust bearing system of any preceding clause, wherein the second spring-loaded assembly is connected to a pump outlet via the first flowline.

Example 13 includes the thrust bearing system of any preceding clause, wherein the spring-loaded assembly includes a plunger including a shaft, a first head, and a second head, the first head positioned distal relative to the second head and toward the thrust disc, a spring connected to the second head, and a stopper coupled to the plunger, the stopper positioned distal relative to the second head and away from the thrust disc.

Example 14 includes the thrust bearing system of any preceding clause, wherein the spring-loaded assembly includes an upper feed hole and a bottom feed hole, the upper feed hole connected to the first flowline, the bottom feed hole connected to the upper feed hole and the bearing chamber.

Example 15 includes the thrust bearing system of any preceding clause, wherein the working fluid in the bearing chamber is to apply a first distributed force on a first surface of the first head, the working fluid in the upper feed hole is to apply a second distributed force on a second surface of the first head, the second surface opposite the first surface.

Example 16 includes the thrust bearing system of any preceding clause, wherein the spring is to apply a spring force on the second head, the first distributed force to act in a first direction, the spring force and the second distributed force to act in a second direction, the first direction opposite the second direction.

Example 17 includes the thrust bearing system of any preceding clause, wherein the plunger is to retract when the first distributed force satisfies a threshold, the threshold based on a combination of the second distributed force and the spring force.

Example 18 includes the thrust bearing system of any preceding clause, wherein the second head is to inhibit flow of the working fluid through the bottom feed hole when the first distributed force does not satisfy the threshold.

Example 19 includes the thrust bearing system of any preceding clause, wherein the first surface of the first head is substantially coplanar with a surface of the first thrust pad or the second thrust pad when the first distributed force does not satisfy the threshold.

Example 20 includes a thrust bearing comprising a pair of thrust pads, a thrust disc positioned between the pair of thrust pads, and at least one spring-loaded assembly integrated into the pair of thrust pads, the at least one spring-loaded assembly including a plunger including a shaft, a first head, and a second head, the first head positioned distal relative to the second head and toward the thrust disc, a spring connected to the second head, and a stopper coupled to the plunger, the stopper positioned distal relative to the second head and away from the thrust disc.

Example 21 includes a thrust bearing system to dynamically support axial thrust in a pump, the thrust bearing system comprising a thrust disc coupled to an impeller shaft, a first thrust pad coupled to a body of the pump, the first thrust pad positioned on a forward side of the thrust disc, a second thrust pad coupled to the body of the pump, the second thrust pad positioned on an aft side of the thrust disc, the first and second thrust pads defining a bearing chamber, and a diaphragm assembly integrated into the first thrust pad, the diaphragm assembly to support a forward axial thrust in the pump, the diaphragm assembly connected to a pump outlet via a first flowline, the first flowline to transmit a working fluid from the pump outlet to the diaphragm assembly.

Example 22 includes the thrust bearing system of any preceding clause, wherein the diaphragm assembly is a first diaphragm assembly, further including a second diaphragm assembly integrated into the second thrust pad, the second diaphragm assembly to support aft an axial thrust in the pump.

Example 23 includes the thrust bearing system of any preceding clause, wherein the second diaphragm assembly is connected to a pump outlet via the first flowline.

Example 24 includes the thrust bearing system of any preceding clause, wherein the diaphragm assembly includes a diaphragm, a diaphragm chamber, and a socket to receive a diaphragm, the diaphragm fixed to the socket.

Example 25 includes the thrust bearing system of any preceding clause, wherein the diaphragm assembly includes an upper feed hole connected to the first flowline and the chamber.

Example 26 includes the thrust bearing system of any preceding clause, wherein the working fluid in the bearing chamber is to apply a first distributed force on a first surface of the diaphragm, the working fluid in the diaphragm chamber is to apply a second distributed force on a second surface of the diaphragm, the second surface opposite the first surface.

Example 27 includes the thrust bearing system of any preceding clause, wherein the diaphragm is to bend when the first distributed force satisfies a threshold, the threshold based on the second distributed force and material properties of the diaphragm.

Example 28 includes the thrust bearing system of any preceding clause, wherein the diaphragm is to inhibit flow of the working fluid through the chamber when the first distributed force does not satisfy the threshold.

Example 29 includes the thrust bearing system of any preceding clause, wherein the first surface of the diaphragm is substantially coplanar with a surface of the first thrust pad or the second thrust pad when first distributed force does not satisfy the threshold.

Example 30 includes a thrust bearing system comprising a thrust disc coupled to an impeller shaft, the thrust disc positioned in a bearing chamber of the thrust bearing system, the thrust disc including a forward channel and an aft channel, the forward and aft channels internal to the thrust disc, the forward channel leading from an outer diameter of the thrust disc to a forward side of the thrust disc, the aft channel leading from the outer diameter of the thrust disc to an aft side of the thrust disc, a first thrust pad positioned forward of the thrust disc, a second thrust pad positioned aft of the thrust disc, the first and second thrust pads defining the bearing chamber, and a spacer including an opening configured to allow a fluid to flow into the bearing chamber, the spacer including a first spacer portion defining a forward portion of the opening, the spacer including a second spacer portion defining an aft portion of the opening, the first and second spacer portions defining a central portion of the opening.

Example 31 includes the thrust bearing system of any preceding clause, wherein the thrust disc includes a first ridge, a second ridge, and a third ridge positioned on a circumferential surface of the thrust disc, the first, second, and third ridges protruding radially outward from a central axis of the thrust bearing system, the second ridge positioned between the first and third ridges.

Example 32 includes the thrust bearing system of any preceding clause, wherein an inlet of the forward channel is positioned between the first and second ridges, and an inlet of the aft channel is positioned between the second and third ridges.

Example 33 includes the thrust bearing system of any preceding clause, wherein the second ridge is configured to inhibit flow through the central portion of the opening when no axial thrust acts on the impeller shaft, the first ridge is configured to inhibit flow through the forward portion of the opening when forward axial thrust acts on the impeller shaft, and the third ridge is configured to inhibit flow through the aft portion of the opening when aft axial thrust acts on the impeller shaft.

Example 34 includes a thrust bearing system to dynamically support axial thrust in a pump, the thrust bearing system comprising a thrust disc coupled to an impeller shaft, a first thrust pad coupled to a body of the pump, the first thrust pad positioned on a forward side of the thrust disc, a second thrust pad coupled to the body of the pump, the second thrust pad positioned on an aft side of the thrust disc, the first and second thrust pads defining a bearing chamber, and a shape-memory alloy deflector to cause a working fluid to flow to the forward side of the thrust disc or the aft side of the thrust disc.

Example 35 includes a thrust bearing system to dynamically support axial thrust in a pump, the thrust bearing system comprising a first thrust pad coupled to a body of the pump, a second thrust pad coupled to the body of the pump, and a thrust disc positioned between the first and second thrust pads, the thrust disc including a tapered edge, the tapered edge configured with an angle to direct flow of a working fluid to a front side of the thrust disc, the tapered edge to cause the working fluid to support a forward axial thrust.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A thrust bearing system to dynamically support axial thrust in a pump, the thrust bearing system comprising: a thrust disc coupled to an impeller shaft, the thrust disc protruding radially outward from the impeller shaft, the impeller shaft coupled to an impeller, the impeller including impeller vanes on a forward side of the impeller and expeller vanes on an aft side of the impeller; a first thrust pad coupled to a body of the pump, the first thrust pad protruding radially inward toward the impeller shaft, the first thrust pad positioned on a forward side of the thrust disc; a second thrust pad coupled to the body of the pump, the second thrust pad protruding radially inward toward the impeller shaft, the second thrust pad positioned on an aft side of the thrust disc; and a spring-loaded assembly integrated into the first and second thrust pads, the spring-loaded assembly connected to a pump outlet via a first flowline, the first flowline to transmit a working fluid from the pump outlet to the forward side of the thrust disc or the aft side of the thrust disc based on a position of the spring-loaded assembly, the spring-loaded assembly including: a plunger disposed in the first flowline; and a spring disposed between a wall of the first thrust pad and the plunger.

2. The thrust bearing system of claim 1, further including a first heat exchanger connected to the first flowline, the first heat exchanger to adjust a temperature, a pressure, and a mass flow rate of the working fluid entering the spring-loaded assembly.

3. The thrust bearing system of claim 1, further including a spacer defining a bearing chamber between the first and second thrust pads, the spacer including an opening.

4. The thrust bearing system of claim 3, further including a second flowline to transmit the working fluid from the pump outlet to the bearing chamber, and a third flowline to return the working fluid from the bearing chamber to the expeller vanes.

5. The thrust bearing system of claim 4, further including a second heat exchanger connected to the second flowline, the second heat exchanger to adjust a temperature, a pressure, and a mass flow rate of the working fluid entering the bearing chamber.

6. The thrust bearing system of claim 4, wherein the second flowline is connected to the bearing chamber at a first point distal to a central axis of the impeller shaft, the first point corresponding to the opening.

7. The thrust bearing system of claim 6, wherein the third flowline is connected to the bearing chamber at second points proximal to the central axis of the impeller shaft, the second points positioned between the first and second thrust pads and the impeller shaft.

8. The thrust bearing system of claim 4, wherein the second flowline is connected to the bearing chamber at second points proximal to a central axis of the impeller shaft, the second points positioned between the first and second thrust pads and the impeller shaft.

9. The thrust bearing system of claim 8, wherein the third flowline is connected to the bearing chamber at a first point distal to the central axis of the impeller shaft, the first point corresponding to the opening.

10. A thrust bearing system to dynamically support axial thrust in a pump, the thrust bearing system comprising: a thrust disc coupled to an impeller shaft; a first thrust pad coupled to a body of the pump, the first thrust pad positioned on a forward side of the thrust disc; a second thrust pad coupled to the body of the pump, the second thrust pad positioned on an aft side of the thrust disc, the first and second thrust pads defining a bearing chamber; and a spring-loaded assembly integrated into the first thrust pad, the spring-loaded assembly to support a forward axial thrust in the pump, the spring-loaded assembly connected to a pump outlet via a first flowline, the first flowline to transmit a working fluid from the pump outlet to the spring-loaded assembly, the spring-loaded assembly including: a plunger disposed in the first flowline; and a spring disposed between a wall of the first thrust pad and the plunger.

11. The thrust bearing system of claim 10, wherein the spring-loaded assembly is a first spring-loaded assembly, further including a second spring-loaded assembly integrated into the second thrust pad, the second spring-loaded assembly to support aft an axial thrust in the pump.

12. The thrust bearing system of claim 11, wherein the second spring-loaded assembly is connected to the pump outlet via the first flowline.

13. The thrust bearing system of claim 10, wherein the plunger includes a shaft, a first head, and a second head, the first head positioned distal relative to the second head and toward the thrust disc, the spring is connected to the second head and the spring-loaded assembly further includes a stopper coupled to the plunger, the stopper positioned distal relative to the second head and away from the thrust disc.

14. The thrust bearing system of claim 13, wherein the spring-loaded assembly includes an upper feed hole and a bottom feed hole, the upper feed hole connected to the first flowline, the bottom feed hole connected to the upper feed hole and the bearing chamber.

15. The thrust bearing system of claim 14, wherein the working fluid in the bearing chamber is to apply a first distributed force on a first surface of the first head, the working fluid in the upper feed hole is to apply a second distributed force on a second surface of the first head, the second surface opposite the first surface.

16. The thrust bearing system of claim 15, wherein the spring is to apply a spring force on the second head, the first distributed force to act in a first direction, the spring force and the second distributed force to act in a second direction, the first direction opposite the second direction.

17. The thrust bearing system of claim 16, wherein the plunger is to retract when the first distributed force satisfies a threshold, the threshold based on a combination of the second distributed force and the spring force.

18. The thrust bearing system of claim 17, wherein the second head is to inhibit flow of the working fluid through the bottom feed hole when the first distributed force does not satisfy the threshold.

19. The thrust bearing system of claim 17, wherein the first surface of the first head is substantially coplanar with a surface of the first thrust pad or the second thrust pad when the first distributed force does not satisfy the threshold.

20. A thrust bearing comprising: a first thrust pad; a second thrust pad; a thrust disc positioned between the first thrust pad and the second thrust pad; and a spring-loaded assembly integrated into the first thrust pad, the spring-loaded assembly including: a plunger including a shaft, a first head, and a second head, the first head positioned distal relative to the second head and toward the thrust disc; a spring including: a first end connected to the second head;

and a second end connected to the first thrust pad; and a stopper coupled to the plunger, the stopper positioned distal relative to the second head and away from the thrust disc.

\* \* \* \* \*